US012792646B1

(12) United States Patent
Carver et al.

(10) Patent No.: US 12,792,646 B1
(45) Date of Patent: Nov. 10, 2026

(54) CONTEXT-AWARE CITATION AND MODIFICATION OF AI-GENERATED CONTENT

(71) Applicant: GOOGLE LLC, Mountain View, CA (US)

(72) Inventors: Brian Carver, Emeryville, CA (US); Owen Lewis, Stanford, CA (US); Christina Yang Choi, San Jose, CA (US); Xin Xie, San Jose, CA (US); Jonathan Malmaud, Campbell, CA (US); Shrestha Basu Mallick, San Francisco, CA (US); Jaclyn Konzelmann, Mountain View, CA (US); James Freedman, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/086,936

(22) Filed: Mar. 21, 2025

Related U.S. Application Data

(60) Provisional application No. 63/722,239, filed on Nov. 19, 2024.

(51) Int. Cl.
*G06F 16/93* (2019.01)
*G06F 16/334* (2025.01)

(52) U.S. Cl.
CPC .................................. *G06F 16/334* (2019.01)

(58) Field of Classification Search
CPC ..................................................... G06F 16/334
See application file for complete search history.

(56) References Cited

U.S. PATENT DOCUMENTS 8,849,799 B1 * 9/2014 Zhao .................. G06F 16/3341 707/721
11,704,351 B1 7/2023 Soleimani
(Continued)

OTHER PUBLICATIONS

Gao, L. et al., "RARR: Researching and Revising What Language Models Say, Using Language Models"; Proceedings of the 61st Annual Meeting of the Association for Computational Linguistics (vol. 1: Long Papers); retrieved from the internet: https: arxiv.org/pdf/2210.08726v2.pdf; 30 pages, dated Dec. 4, 2022.
(Continued)

*Primary Examiner* — Debbie M Le
(74) *Attorney, Agent, or Firm* — Gray Ice Higdon

(57) ABSTRACT

Implementations described herein relate to modifying responsive content generated by a generative model (GM) and using dynamic, context-aware modification schema(s). Processor(s) of a system can: receive user input; generate responsive content using the GM; and determine whether a corresponding segment of the responsive content matches a corresponding segment of additional data. In response to determining there is a match, the processor(s) can determine a given modification schema to apply to modify the corresponding segment of the responsive content, and generate, based on the given modification schema, modified responsive content to be rendered in lieu of the responsive content. The processor(s) can determine the given modification schema based on, for example, a type of request included in the user input, a type of content included in the response content, metadata that is received along with the user input, and/or other factors.

20 Claims, 8 Drawing Sheets

(56) References Cited

U.S. PATENT DOCUMENTS

| | | | | |
|---|---|---|---|---|
| 11,763,069 | B2 | 9/2023 | Makino | |
| 11,769,017 | B1 * | 9/2023 | Gray | G06F 40/56<br>704/9 |
| 12,517,954 | B1 * | 1/2026 | Trown | G06F 16/90335 |
| 12,536,183 | B1 * | 1/2026 | Maharaj | G06F 16/24578 |
| 2018/0113922 | A1 | 4/2018 | Gulwani | |
| 2019/0325066 | A1 | 10/2019 | Krishna | |
| 2021/0295822 | A1 | 9/2021 | Tomkins et al. | |
| 2021/0374338 | A1 | 12/2021 | Shrivastava | |
| 2022/0318522 | A1 | 10/2022 | Wolf | |
| 2022/0414320 | A1 * | 12/2022 | Dolan | G06F 40/30 |
| 2023/0020886 | A1 | 1/2023 | Mahapatra | |
| 2024/0338554 | A1 * | 10/2024 | Schmidt | G06N 3/045 |

OTHER PUBLICATIONS

Dunn, A. et al., "Structured information extraction from complex scientific text with fine-tuned large language models"; arXiv.org., Cornell University; arXiv.2212.05238v1; 21 pages; dated Dec. 10, 2022.

Chung, H.W. et al., "Scaling Instruction-Finetuned Language Models"; arXiv.org, Cornell University; arXiv:2210.11416v5; 54 pages; dated Dec. 6, 2022.

* cited by examiner

CONTEXT-AWARE CITATION AND MODIFICATION OF AI-GENERATED CONTENT

BACKGROUND

Various generative models (GMs) have been proposed that can be used to process image content, video content, audio content, natural language (NL) content (e.g., typed content or spoken content), and/or other input(s), to generate content that is responsive to these input(s). These GMs are typically trained on enormous amounts of diverse data including data from, but not limited to, webpages, images, videos, books, software code, news articles, and machine translation data. Accordingly, in performing various tasks, these GMs leverage the underlying data on which they were trained, and optionally other data, such as user provided documents, search result documents obtained as part of a retrieval augmented generation (RAG) process, and so on, in generating the responsive content.

In instances where these GMs generate responsive content leveraging the underlying data on which they were trained and/or leveraging search result documents obtained as part of a RAG process, some of these GMs have also been trained to cite sources thereof, or other system(s) that are in addition to these GMs have been developed to process the responsive content to cite sources thereof. For example, some of these GMs can be trained to cite webpages, images, videos, electronic books, software code, electronic news articles, machine translation data, search result documents obtained as part of a RAG process, and/or other sources of content. However, some content may be associated with multiple disparate sources, and rule(s) and/or schema(s) that these GMs utilize to determine a given source, from among the multiple disparate sources, to cite in the responsive content may be not flexible such that the given source cited for the content may be objectively nonsensical to users, which can result in users providing additional input(s) to determine why these GMs cited the given source, thereby wasting computational and/or network resources, or decreasing user satisfaction.

As an example, assume that a user provides input of "what are Einstein's 10 most famous quotes", and responsive content that includes a listing of the 10 most famous Einstein quotes is generated as the responsive content and GitHub® is cited as the source for those 10 Einstein quotes. In this example, the 10 Einstein quotes may be stored in a GitHub® repository, so the citation may not be inaccurate, but it would be objectively nonsensical to the user such that the user is likely to provide additional user input asking why the GM cited GitHub® as the source for those 10 Einstein quotes, thereby wasting computational and/or network resources in responding to the additional user input, or otherwise providing a subpar user experience.

SUMMARY

Implementations described herein relate to modifying responsive content generated by a generative model (GM) and using dynamic, context-aware modification schema(s). Processor(s) of a system can: receive user input; generate responsive content using the GM; and determine whether a corresponding segment of the responsive content matches a corresponding segment of additional data. In response to determining there is a match, the processor(s) can determine a given modification schema to apply to modify the corresponding segment of the responsive content, and generate, based on the given modification schema, modified responsive content to be rendered in lieu of the responsive content. The processor(s) can determine the given modification schema based on, for example, a type of request included in the user input, a type of content included in the response content, metadata that is received along with the user input, and/or other factors. By dynamically applying the given modification schema to the corresponding segment of the responsive content, the processor(s) can, for example, attribute the corresponding segment of the responsive content to a particular source will objectively resonate with a user, thereby eliminating and/or mitigating instances in which the user provides additional user inputs the requests the GM explain why a given source was cited for the corresponding segment of the responsive content. As a result, computational and/or network resources are conserved and a human-to-computer dialog session between the user and the GM can be concluded in a more quick and efficient manner.

In various implementations, different modification schemas can each prioritize different types of source for attribution. The system uses these modification schemas to dynamically adapt attribution to sources based on contextual cues like the user's request type (e.g., code generation vs. text summarization), the content type of the generated response (e.g., code vs. text), and metadata associated with the user input (e.g., device type, API used). This prioritization ensures that cited sources for attribution are contextually relevant, thereby improving user experience and reducing resource consumption from follow-up user inputs. For example, a code generation request might prioritize GitHub® repositories, while a factual query might favor established encyclopedias. However, the system can fall back to citing other sources if none are available from a prioritized type of source.

For example, assume a user provides user input of "summarize the plot of Hamlet" to a client device that has access to the system. In this example, further assume that the system generates responsive content including a summary of the plot of Hamlet. If a segment of the generated summary matches a segment in a Shakespearean work, the system applies a modification schema prioritizing Shakespearean work as a source thereof based on, for instance, a type of content included in the responsive content including the summary of the Shakespearean work Hamlet. The modified responsive content would then include a citation to the relevant Shakespearean work, providing a contextually appropriate attribution. Notably, in this example, the segment of the generated summary may also match a segment in, for instance, a scholarly book on Shakespeare or an online encyclopedia like Wikipedia. However, the system determines that the generated content is a summary and that citing a Shakespearean work (if available) would objectively resonate more with the user seeking a plot summary compared to citing a scholarly book or an online encyclopedia, based on the segment of the responsive content matching a segment in the Shakespearean work.

Although the above example is described with respect to prioritizing sources based on the type of content that is included in the responsive content, it should be understood that this is for the sake of example and is not meant to be limiting. For example, the system can additionally, or alternatively, determine to prioritize sources based on one or more other factors, such as, for example, a type of request included in the user input, a type of metadata that is received along with the user input, and/or other factors. For instance, had the user input been "summarize the plot of Hamlet and generate a word cloud based on the summary", then the system can prioritize a source of the word cloud over a source of the summary of the plot of Hamlet. Also, for instance, had the user input been received as a voice input from the client device of the user, the source can simply be "Hamlet", whereas had the user input been received as a text input from the client device of the user, the source can be a link to the entirety of Hamlet. Accordingly, it should be understood that any of these and other various features are contemplated herein.

The above description is provided as an overview of some implementations of the present disclosure. Further description of those implementations, and other implementations, are described in more detail below.

DETAILED DESCRIPTION OF THE DRAWINGS

Figure 1:
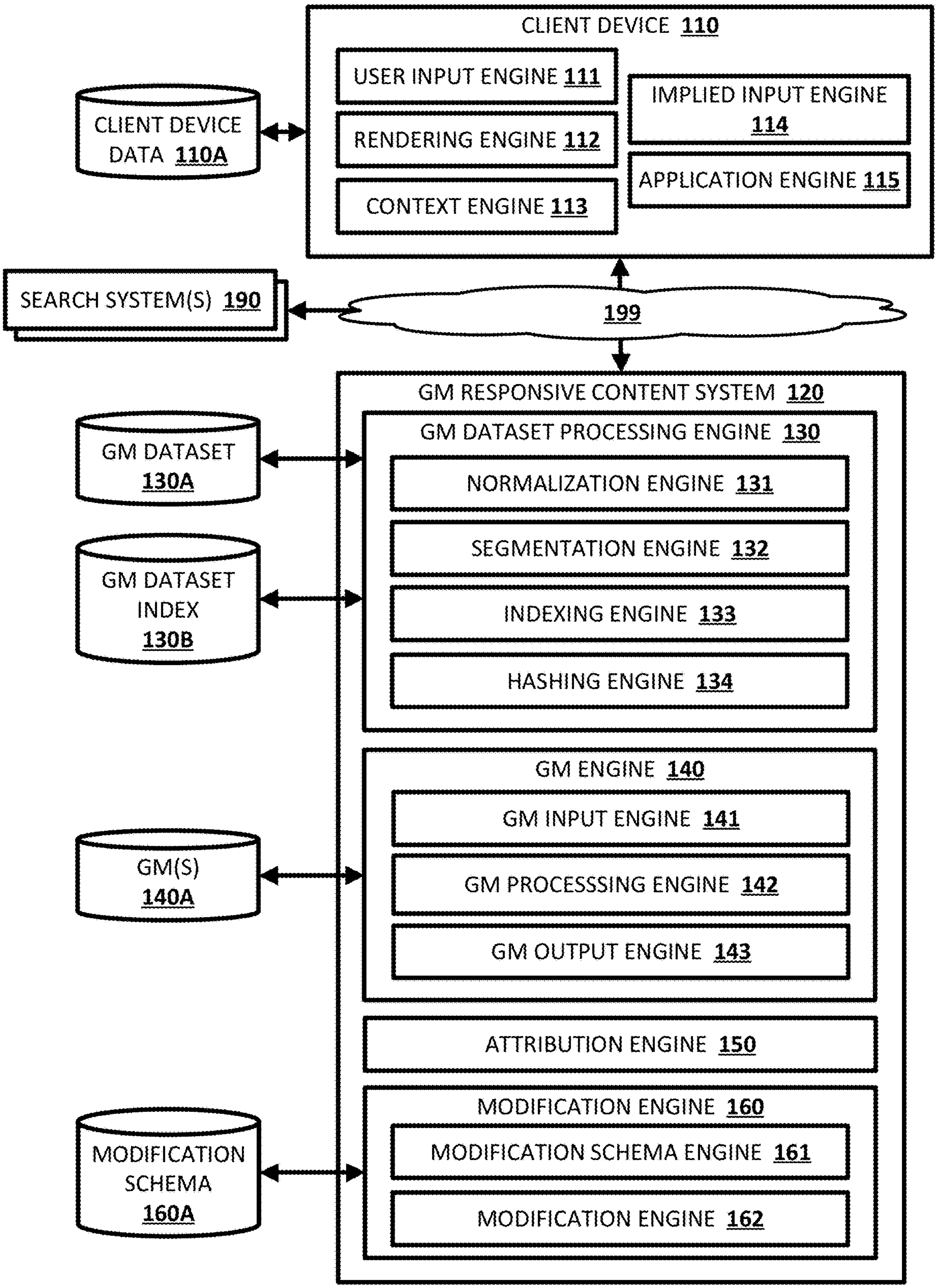
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110, a generative model (GM) responsive content system 120, and search system(s) 190. Although illustrated separately, in some implementations, all or aspects of the GM responsive content system 120 can be implemented locally at the client device 110. In additional or alternative implementations, all or aspects of the GM responsive content system 120 can be implemented remotely from the client device 110 as depicted in FIG. 1 (e.g., at remote server(s)). In those implementations, the client device 110 and the GM responsive content system 120 can be communicatively coupled with each other via one or more networks 199, such as one or more wired or wireless local area networks ("LANs," including Wi-Fi® LANs, mesh networks, Bluetooth®, near-field communication, etc.) or wide area networks ("WANs", including the Internet). Further, the client device 110 and/or the GM responsive content system 120 can interact with the search system(s) 190 via one or more of the networks 199.

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

In various implementations, the client device 110 can execute one or more software applications, via application engine 115, through which user input(s) can be submitted and/or responsive content (e.g., that is responsive to the user input(s)) can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser installed on top of the operating system of the client device 110, or the web browser can be a software application that is integrated as part of the operating system of the client device 110. The application engine 115 (and the one or more software applications executed by the application engine 115) can interact with the GM responsive content system 120, and optionally via a dedicated generative content software application, an automated assistant, or the like.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to typed input and/or touch input directed to the client device 110.

Some instances of a user input described herein can be a prompt or query for responsive content that is formulated based on user input provided by a user of the client device 110 and detected via user input engine 111. For example, the prompt or query can be a typed prompt or query that is typed via a physical or virtual keyboard, a suggested prompt or query that is selected via a touch screen or a mouse of the client device 110, a spoken voice prompt or voice query that is detected via microphone(s) of the client device 110, or an image prompt or query that is based on an image or video captured by vision component(s) of the client device 110 (or based on a prompt or query generated based on processing the image or video using, for example, object detection model(s), captioning model(s), etc.). Other instances of user input are contemplated herein.

In various implementations, the client device 110 can include a rendering engine 112 that is configured to render responsive content, an indication of source(s) associated with the responsive, and/or other content for audible and/or visual presentation to a user of the client device 110. For example, the client device 110 can be equipped with one or more speakers that enable the responsive content to be provided for audible presentation to the user via the client device 110. Additionally, or alternatively, the client device 110 can be equipped with a display or projector that enables the content to be provided for visual presentation to the user via the client device 110.

In various implementations, the client device 110 can include a context engine 113 that is configured to determine a context (e.g., current or recent context) of the client device 110 and/or of a user of the client device 110 (e.g., an active user of the client device 110 when the client device 110 is associated with multiple users). In some versions of those implementations, the context engine 113 can determine a context based on data stored in client device data database 110A. The data stored in the client device data database 110A can include, for example, user interaction data that characterizes current or recent interaction(s) of the client device 110 and/or of a user of the client device 110, location data that characterizes a current or recent location(s) of the client device 110 and/or of a user of the client device 110, user attribute data that characterizes one or more attributes of a user of the client device 110, user preference data that characterizes one or more preferences of a user of the client device 110, user profile data that characterizes a profile of a user of the client device 110, and/or other data associated with the client device 110 and/or a user of the client device 110.

For example, the context engine 113 can determine a current context based on a current state of a dialog session (e.g., considering one or more recent prompts or queries provided by a user during the dialog session, responsive content provided by the GM responsive content system 120 during the dialog session), profile data, and/or a current location of the client device 110. For instance, the context engine 113 can determine a current context of "visitor looking for popular events in Louisville, Kentucky" based on a recently issued prompt or query, profile data, and an anticipated future location of the client device 110 (e.g., based on recently booked hotel accommodations and/or flight accommodations). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting a prompt or query that is formulated based on user input, in generating an implied prompt or implied query (e.g., a query or prompt formulated independent of user input), and/or in determining to submit an implied prompt or implied query and/or to render result(s) (e.g., responsive content) for an implied prompt or implied query.

In various implementations, the client device 110 can include an implied input engine 114 that is configured to: generate an implied prompt or implied query independent of any user input directed to formulating the implied query or the implied prompt; to submit an implied prompt or implied query, optionally independent of any user input that requests submission of the implied prompt or implied query; and/or to cause rendering of search result(s) or a responsive content for an implied prompt or implied query, optionally independent of any user input that requests rendering of the search result(s) or the responsive content. For example, the implied input engine 114 can use one or more past or current contexts, from the context engine 113, in generating an implied prompt or implied query, determining to submit the implied query or the implied prompt, and/or in determining to cause rendering of search result(s) or responsive content that is responsive to the implied query or the implied prompt. For instance, the implied input engine 114 can automatically generate and automatically submit an implied prompt or implied query based on the one or more past or current contexts. Further, the implied input engine 114 can automatically push the search result(s) or the responsive content that is generated responsive to the implied prompt or implied query to cause them to be automatically rendered or can automatically push a notification of the search result(s) or the responsive content, such as a selectable notification that, when selected, causes rendering of the search result(s) or the responsive content. Additionally, or alternatively, the implied input engine 114 can submit the implied query or the implied prompt at regular or non-regular intervals, and cause the search result(s) or the responsive content for the submission(s) to be automatically provided (or a notification thereof automatically provided). For instance, the implied query or the implied prompt can be "patent news" based on the one or more past or current contexts indicating a user's general interest in patents, the implied query or the implied prompt periodically submitted, and the search result(s) or the responsive content can be automatically provided (or a notification thereof automatically provided). It is noted that the provided search result(s) or responsive content result can vary over time in view of, e.g., presence of new/fresh search result document(s) over time.

Further, the client device 110 and/or the GM responsive content system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The GM responsive content system 120 is illustrated in FIG. 1 as including a GM dataset processing engine 130, a GM engine 140, an attribution engine 150, and a modification engine 160. Some of these engines can be combined and/or omitted in various implementations. Further, these engines can include various sub-engines. For instance, the GM dataset processing engine 130 is illustrated in FIG. 1 as including a normalization engine 131, a segmentation engine 132, an indexing engine 133, and a hashing engine 134. Further, the GM engine 140 is illustrated in FIG. 1 as including a GM input engine 141, a GM processing engine 142, and a GM output engine 143. Moreover, the modification engine 160 is illustrated in FIG. 1 as including a modification schema engine 161 and a modification engine 162. Some of these sub-engines can be combined and/or omitted in various implementations. Accordingly, it should be understood that the various engines and sub-engines of the GM responsive content system 120 illustrated in FIG. 1 are depicted for the sake of clarity and are not meant to be limiting.

Further, the GM responsive content system 120 is illustrated in FIG. 1 as interfacing with various databases, such as a GM dataset database 130A, a GM dataset index database 130B, a GM(s) database 140A, and a modification schema database 160A. Although particular engines and/or sub-engines are depicted as having access to particular databases, it should be understood that is for the sake of example and is not meant to be limiting. For instance, in some implementations, each of the various engines and/or sub-engines of the GM responsive content system 120 may have access to each of the various databases. However, in some other implementations, one or more of the various databases may be access-restricted.

As described herein, a GM stored in the GM(s) database 140A can be any sequence-to-sequence based machine learning model capable of generating generative vision data, generative audio data, generative textual data, and/or other forms of generative data. Some non-limiting examples of these sequence-to-sequence based machine learning models that are capable of generating one or more forms of the generative data noted above include transformer-based machine learning models (e.g., encoder-decoder transformer models, encoder-only transformer models, decoder-only transformer models, etc. that optionally employ an attention mechanism or some other form of memory), stable diffusion-based machine learning models, recurrent neural network-based machine learning models, generative adversarial network-based machine learning models, etc. Various sequence-to-sequence based machine learning models have demonstrated multimodal capabilities in that they are capable of processing inputs in various modalities (e.g., text-based inputs, vision-based inputs, audio-based inputs, etc.) and generating outputs in various modalities (e.g., text-based output, vision-based outputs, audio-based generative outputs, etc.). Some particular non-limiting examples of these sequence-to-sequence based machine learning models that have demonstrated multimodal capabilities include the Gemini family of models, the ChatGPT family of models, the Claude family of models, the Llama family of models, and/or other families of sequence-to-sequence generative models.

As described in more detail herein, the GM responsive content system 120 can be initially utilized to generate responsive content that is responsive to user input and based on processing at least the user input using the GM. Further, the GM responsive content system 120 can be subsequently utilized to process the responsive content, before it is rendered for presentation to a user of the client device 110 that provided the user input, to determine whether segment(s) of the responsive content match segment(s) of additional data. The additional data can include, for example, a GM training dataset that was utilized to initially train the GM, search result documents obtained as part of a retrieval augmented generation (RAG) process, user provided content that was provided by the user along with the user input, and/or other content. Assuming that segment(s) of the responsive content match segment(s) of the additional data, the GM responsive content system 120 can determine a given modification to apply to the segment(s) of the responsive content to generate modified responsive content. Further, the GM responsive content system 120 can cause the modified responsive content to be rendered for presentation to the user via the client device 110 and in lieu of the responsive content. The given modification schema can be determined based on, for example, a type of request included in the user input (e.g., whether the user input includes a text generation request, an image generation request, a code generation request, a text translation request, an analytical request, a retrieval request, etc.), a type of content included in the responsive content (e.g., whether the responsive content includes text, image(s), video(s), code, certain combinations thereof, etc.), metadata that is received along with the user input (e.g., a type of client device from which the user input is received, a type of interface through which the user input was received, an application programming interface (API) through which the user input was received, a user account type associated with the user from which the user input was received, a user account status associated with the user from which the user input was received, certain combinations thereof, etc.), and/or based on other factors. Notably, the given modification schema that is applied to the segment(s) of the responsive content can be one of a plurality of modification schemas, and each of the plurality of modification schemas can prioritize different type of sources to cite in modifying the segment(s) of the responsive content. As a result, techniques described herein cite logical sources when modifying the segment(s) of the responsive content, thereby mitigating and/or eliminating instances where the user would provide follow up user inputs to determine why the GM responsive content system 120 attributed certain segment(s) of the responsive content to certain sources which, in turn, conserves computational and/or network resources by mitigating and/or eliminating instances where these follow up user inputs would otherwise need to be processed.

Figure 2:
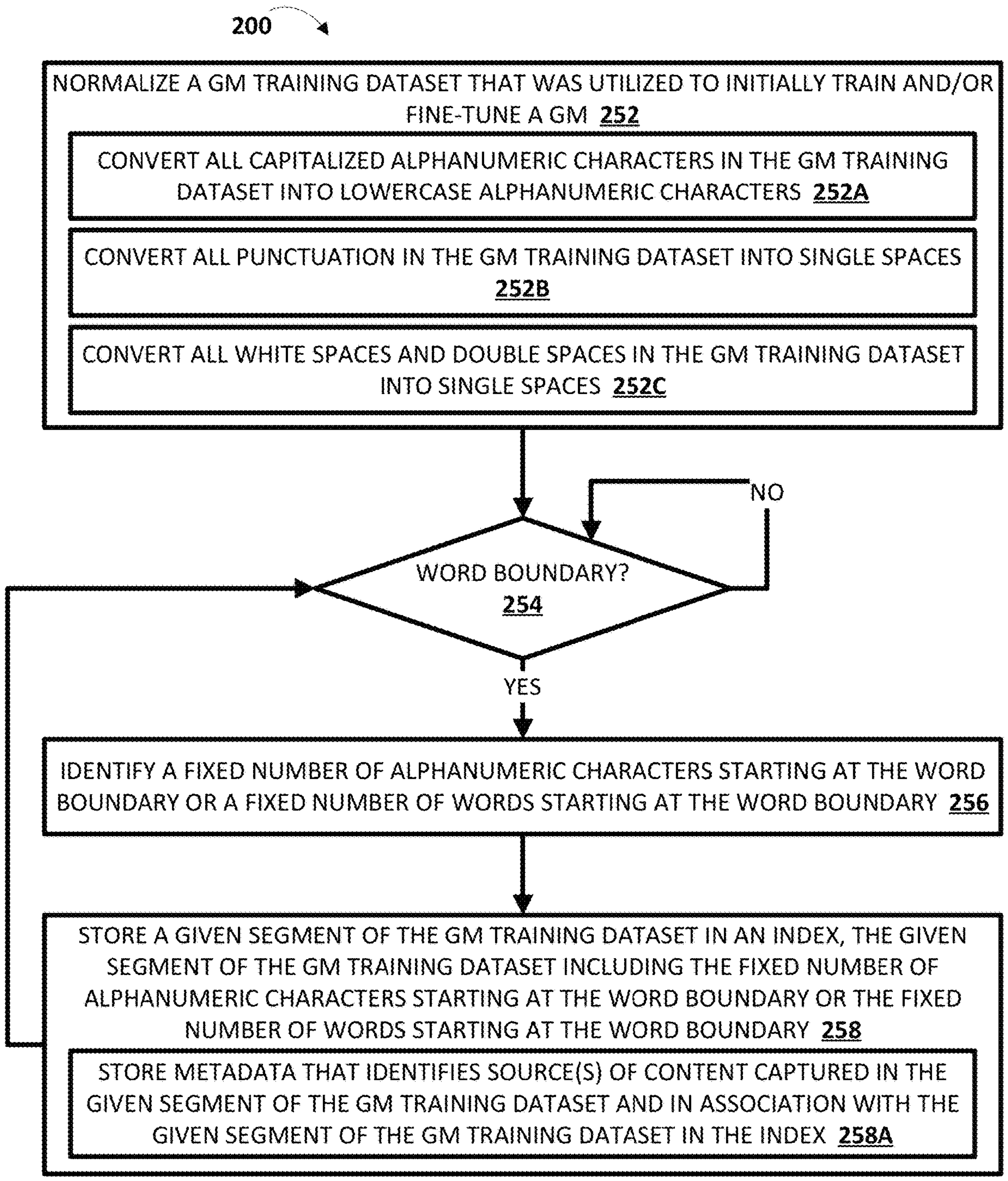
FIG. 2 depicts a flowchart illustrating an example method of processing a GM training dataset that was utilized to initially train a GM and/or fine-tune the GM, in accordance with various implementations.

Turning now to FIG. 2, a flowchart illustrating an example method 200 of processing a GM training dataset that was utilized to initially train a GM and/or fine-tune the GM is depicted. For convenience, the operations of the method 200 are described with reference to a system that performs the operations. This system of the method 200 includes one or more processors, memory, and/or other component(s) of computing device(s) (e.g., client device 110 of FIG. 1, GM responsive content system 120 of FIG. 1, computing device 710 of FIG. 7, one or more servers, and/or other computing devices). Moreover, while operations of the method 200 are shown in a particular order, this is not meant to be limiting. One or more operations may be reordered, omitted, and/or added.

At block 252, the system normalizes a GM training dataset (e.g., stored in the GM dataset database 130A) that was utilized to initially train and/or fine-tune a GM. The system can cause the normalization engine 131 to process the GM training dataset using various normalization operations to normalize the GM training dataset. For example, at sub-block 252A, the normalization engine 131 can convert all capitalized alphanumeric characters in the GM training dataset into lowercase alphanumeric characters. As another example, at sub-block 252B, the normalization engine 131 can convert all punctuation in the GM training dataset into single spaces. As yet another example, at sub-block 252C, the normalization engine 131 can convert all white spaces and double spaces in the GM training dataset into single spaces. Additional, or alternative, normalization operations are contemplated herein.

Notably, the GM training dataset can include natural language content that may be utilized to initially train and/or fine-tune the GM, such as data from webpages (e.g., public domain webpages, licensed webpages, non-public domain webpages, and/or other webpages), electronic books (e.g., public domain electronic books and/or non-public domain electronic books), electronic documents (e.g., electronic word processing documents, electronic PDFs, etc.), electronic communications (e.g., electronic mail, SMS messages, social media posts or messages), software code (e.g., public domain software code, licensed software code, and/or non-public domain software code), electronic news articles, mathematical formulas, machine translation data, and/or any other data from any other source that can be utilized to train and/or fine-tune the GM. Further, the different sources of the different instances of the GM training dataset may each have different formats. However, by normalizing the GM training dataset, the system can more quickly and efficiently compare segment(s) of responsive content to segment(s) of the GM training dataset. Put another way, the GM dataset normalization engine 131 can implement various normalization operations on the dataset in an "offline" manner prior to receiving any user input to enable the system to subsequently compare segment(s) of the responsive content to segment(s) of the GM training dataset.

At block 254, the system processes alphanumeric characters of the normalized GM dataset to identify a word boundary in the normalized GM training dataset. The system can cause the segmentation engine 132 to identify the word boundaries in the normalized GM training dataset. Notably, the word boundary can include any string of alphanumeric characters in the normalized GM training dataset that defines a word. For example, assume that the dataset includes the alphanumeric characters of "prima facie case of patent ineligible subject matter". In this example, "prima" may correspond to a first word boundary, "facie" may correspond to a second word boundary, "case" may correspond to a third word boundary, and so on. The segmentation engine 132 can continually process the normalized GM training dataset to identify word boundaries. If, at an iteration of block 254, the system determines that no word boundary in the normalized GM training dataset has been identified, then the system continues processing the normalized GM training dataset to identify a word boundary at block 254. If, at an iteration of block 254, the system determines that a word boundary has been identified, then the system proceeds to block 256.

At block 256, the system identifies a fixed number of alphanumeric characters starting at the word boundary or a fixed number of words starting at the word boundary. The system can cause the segmentation engine 132 to not only identify the word boundary, but also cause the segmentation engine 132 to identify the fixed number of alphanumeric characters starting at the word boundary or the fixed number of words starting at the word boundary. Notably, the fixed number of alphanumeric characters starting at the word boundary and/or the fixed number of words starting at the word boundary can be a tunable parameter that can be dynamically adjusted by a developer associated with the system.

At block 258, the system stores a given segment of the GM training dataset in an index, the given segment of the GM training dataset including the fixed number of alphanumeric characters starting at the word boundary or the fixed number of words starting at the word boundary. In some implementations, block 258 includes sub-block 258A in which the system stores metadata that identifies one or more sources of content captured in the given segment of the GM training dataset and in association with the given segment of the GM training dataset in the index. The system can cause the indexing engine 133 to store the given segment of the GM training dataset in the index (e.g., the GM dataset index 130B), and optionally in association with an indication of the one or more sources thereof. The system returns to block 254 to process the alphanumeric characters of the normalized dataset to identify an additional word boundary in the normalized dataset. Notably, a quantity of the segments stored in the GM dataset index database 130B can be in the order of hundreds of billions or trillions of segments.

Continuing with the above example where the GM training dataset includes the alphanumeric characters of "prima facie case of patent ineligible subject matter", further assume that the system utilizes the fixed number of words starting at the word boundary, and further assume that the fixed number of words starting at the words boundary corresponds to six as defined by the developer associated with the system. In this example, a first dataset alphanumeric segment may correspond to "prima facie case of patent ineligible" that starts at the first word boundary of "prima", a second dataset alphanumeric segment may correspond to "facie case of patent ineligible subject" that starts at the second word boundary of "facie", a third dataset alphanumeric segment may correspond to "case of patent ineligible subject matter" that starts at the third word boundary of "case", and so on. Further, the system can store each of the dataset alphanumeric segments in an index.

Further, and continuing with the above example where the GM training dataset includes the alphanumeric characters of "prima facie case of patent ineligible subject matter", further assume that the alphanumeric characters of "prima facie case of patent ineligible subject matter" are associated with one or more sources. For instance, the alphanumeric characters of "prima facie case of patent ineligible subject matter" may be associated with an electronic document corresponding to the Manual of Patent Examining Procedure (MPEP) that was utilized to initially train and/or fine-tune the GM. Accordingly, in this instance, the alphanumeric characters can be stored in association with metadata that indicates the alphanumeric characters of "prima facie case of patent ineligible subject matter" is derived from the MPEP and optionally include a corresponding link (e.g., a uniform resource locator (URL)) to an electronic version of the MPEP, a corresponding deep link to a particular chapter or section of the MPEP, etc.

In various implementations, one or more iterations of the operations of the method 200 of FIG. 2 can be performed in parallel. For instance, the system can continue normalizing the GM training dataset while the system also identifies the word boundaries, identifies the dataset alphanumeric segments, and stores the dataset alphanumeric segments in the index. Further, although the above alphanumeric segments from the above example are described as including six words, it should be understood that is for the sake of example and is not meant to be limiting. Rather, it should be understood that the developer associated with the system (or a developer associated with the third-party) can define different lengths of the alphanumeric segments.

Although the method 200 of FIG. 2 is described with respect to generating the index of the GM training dataset in a particular manner, it should be understood that is for the sake of example to illustrate various techniques contemplated herein, and is not meant to be limiting. For example, in additional or alternative implementations, the system can generate Bloom Filter(s) for the respective segments of the GM training dataset, as opposed to raw strings of the normalized GM training dataset. These Bloom Filter(s) can offer better compression in terms of storage space, and, as a result, can enable the storage of more segments. However, these Bloom Filter(s) may not provide the option for storing the corresponding metadata in association with the segments that include the source(s) of the content captured in the segments. Thus, these Bloom Filter(s) may add a layer of complexity that is obviated through utilization of the GM dataset index 130B.

As another example, in additional or alternative implementations, the system can cause the hashing engine 134 to generate, using a hash function, hashes for the respective segments of the GM training dataset, as opposed to raw strings of the normalized GM training dataset. Similar to the aforementioned Bloom Filter(s), these hashes can offer better compression in terms of storage space, and, as a result, can enable the storage of more segments. However, and similar to the aforementioned Bloom Filter(s), these hashes may not provide the option for storing the corresponding metadata in association with the segments that includes the source(s) of the content captured in the segments. Thus, these Bloom Filter(s) may add a layer of complexity that is obviated through utilization of the GM dataset index 130B. Moreover, both the Bloom Filter(s) and hashes may be limited in that they are more conducive to only detecting exact matches and not enable fuzzy matching (e.g., as described with respect to the corresponding edit distance and FIG. 5).

Figure 3:
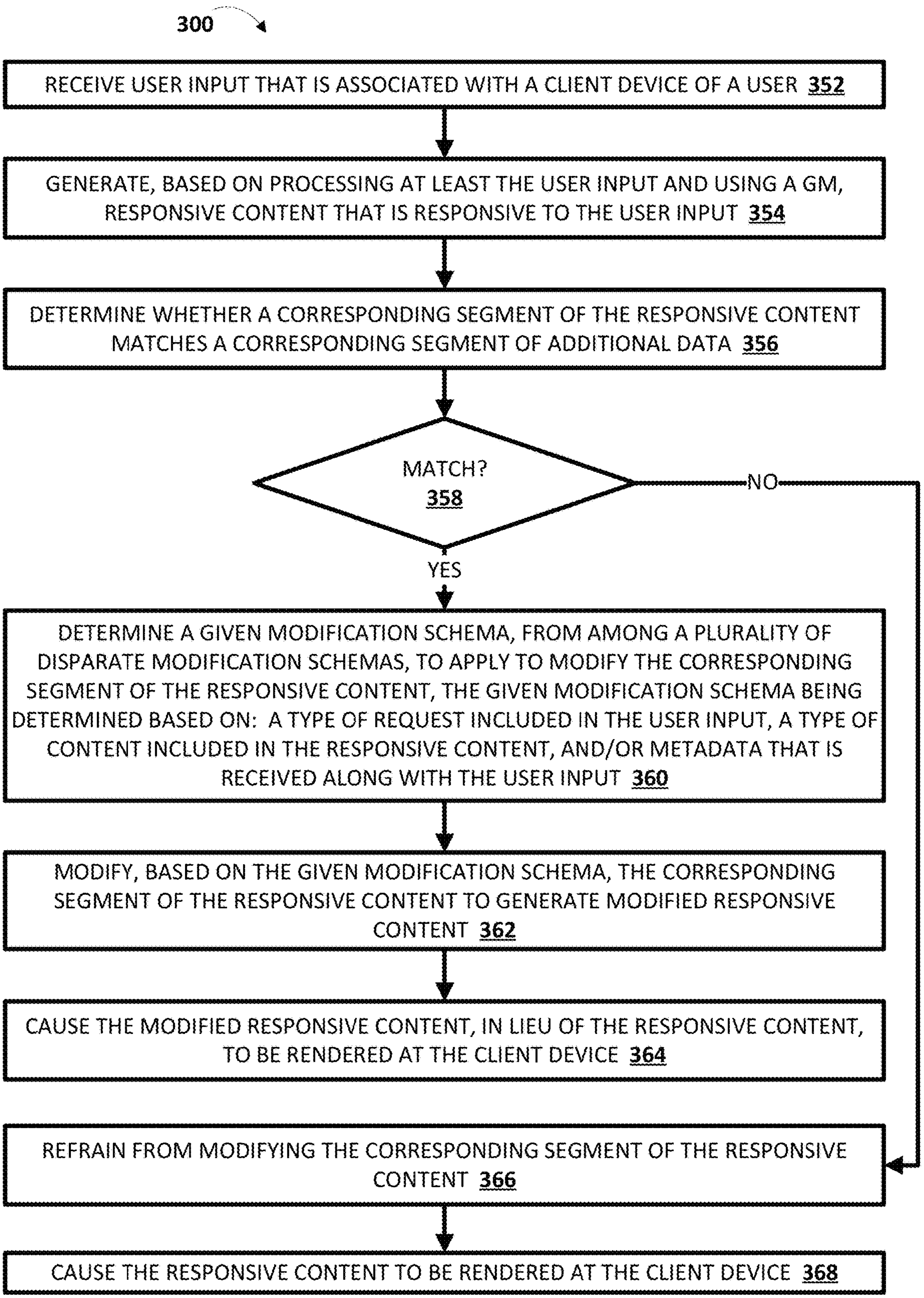
FIG. 3 depicts a flowchart illustrating an example method of determining whether to modify responsive content generated using a GM, in accordance with various implementations.

Turning now to FIG. 3, a flowchart illustrating an example method 200 of processing a GM training dataset that was utilized to initially train a GM and/or fine-tune the GM is depicted. For convenience, the operations of the method 200 are described with reference to a system that performs the operations. This system of the method 200 includes one or more processors, memory, and/or other component(s) of computing device(s) (e.g., client device 110 of FIG. 1, GM responsive content system 120 of FIG. 1, computing device 710 of FIG. 7, one or more servers, and/or other computing devices). Moreover, while operations of the method 200 are shown in a particular order, this is not meant to be limiting. One or more operations may be reordered, omitted, and/or added.

At block 352, the system receives user input that is associated with a client device of the user. For instance, the user input can include typed or spoken input provided by a user of the client device (e.g., detected via the user input engine 111 of the client device 110). Put another way, the user input can be a natural language prompt or query.

At block 354, the system generates, based on processing at least the user input and using a GM, responsive content that is responsive to the user input. In generating the responsive content that is responsive to the user input, the system can cause the GM input engine 141 to determine GM input. The GM input can include the user input, and optionally other contextual information such as a dialog history of an ongoing dialog, system information associated with the system, client device information associated with the client device from which the user input was received, search result documents obtained using a retrieval augmented generation (RAG) process, etc. Further, the system can cause the GM processing engine 142 to process, using the GM, the GM input to generate GM output. The GM output can include, for example, a probability distribution over a sequence of tokens, such as a probability distribution over a sequence of word units, a sequence of words, a sequence of phrases, or other sequences of tokens. Moreover, the system can cause the GM output engine 143 to determine, based on the probability distribution over the sequence of tokens, the responsive content that is responsive to the user input. For example, the GM output engine 143 can select word units, word, phrases, or other tokens for inclusion in the responsive content based on the probability distribution over the sequence of tokens and using various decoding techniques (e.g., greedy decoding, beam decoding, sampling decoding, etc.).

At block 356, the system determines whether a corresponding segment of the responsive content matches a corresponding segment of additional data. The additional data can include, for example, a GM training dataset that was utilized to initially train and/or fine-tune the GM, search result documents obtained using a RAG process, user provided content that was provided by the user along with the user input, and/or other content. For example, the system can normalize the responsive content (e.g., in the same or similar manner described with respect to the operations of block 252 of the method 200 of FIG. 2), and any additional data that was not previously normalized (e.g., any search result documents obtained using a RAG process, any user provided content that was provided by the user along with the user input). Further, the system can segment the responsive content (e.g., in the same or similar manner described with respect to the operations of blocks 254 and 256 of the method 200 of FIG. 2), and any normalized additional data that was not previously segmented. In some implementations, the system can cause the attribution engine 150 to compare the normalized and segmented responsive content directly with the segment(s) of the additional data to determine whether a corresponding segment of the responsive content matches a corresponding segment of the additional data. In additional or alternative implementations, the system can cause the attribution engine 150 to generate, using a hash function, corresponding hashes for the responsive content and compare the corresponding hashes for the responsive to corresponding hashes for the additional data to determine whether a corresponding segment of the responsive content matches a corresponding segment of opt-out content. Determining whether a corresponding segment of the responsive content matches a corresponding segment of the additional data is described in more detail herein (e.g., with respect to FIG. 4).

At block 358, if the system determines that a corresponding segment of the responsive content matches a corresponding segment of the additional data at block 356, then the system proceeds to block 360. At block 360, the system determines a given modification schema, from among a plurality of modification schemas, to apply to modify the corresponding segment of the responsive content, the given modification schema being determined based on: a type of request included in the user input, a type of content included in the responsive content, and/or metadata that is received along with the user input. For example, the system can cause the modification schema engine 161 to determine the given modification schema. Additional detail on determining the given modification schema is provided herein (e.g., with respect to FIGS. 5, 6A, and 6B).

At block 362, the system modifies, based on the given modification schema, the corresponding segment of the responsive content to generate modified responsive content. For example, the system can cause the modification engine 162 to modify the corresponding segment of the responsive content to generate the modified responsive content and based on the given modification schema. Additional detail on modifying the corresponding segment of the responsive content to generate the modified responsive content is provided herein (e.g., with respect to FIGS. 5, 6A, and 6B).

At block 364, the system causes the modified responsive content, in lieu of the responsive content, to be rendered at the client device. For example, the system can cause the modified responsive content to be visually rendered and/or audibly rendered via the client device from which the user input was received.

At block 358, if the system determines that a corresponding segment of the responsive content does not match a corresponding segment of the additional data at block 356, then the system proceeds to block 366. At block 366, the system refrains from modifying the corresponding segment of the responsive content. At block 368, the system causes the responsive content to be rendered at the client device. For example, the system can cause the responsive content to be visually rendered and/or audibly rendered via the client device from which the user input was received.

Although the method 300 of FIG. 3 is described with respect to determining whether a corresponding segment of the responsive content matches a corresponding segment of additional data, it should be understood that is for the sake of brevity to illustrate techniques contemplated herein and is not meant to be limiting. For example, the system can run multiple instances of the method 300 or certain operations of the method 300, in parallel, to compare all of the corresponding segments of the responsive content to all of the corresponding segments of the additional data. As another example, the system can run multiple instances of the method 300 or certain operations of the method 300, in sequence, to compare all of the corresponding segments of the responsive content to all of the corresponding segments of the additional data.

Figure 4:
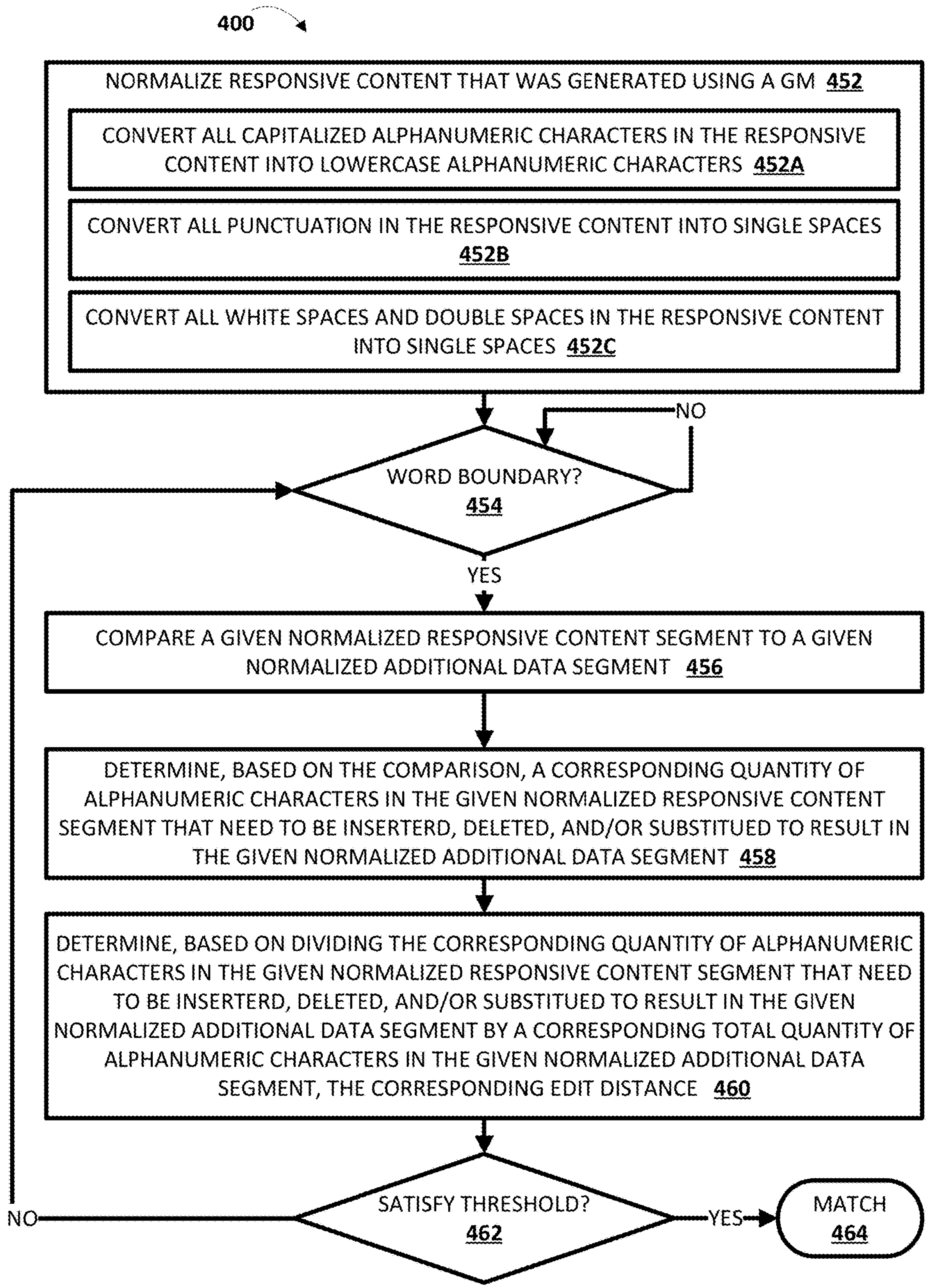
FIG. 4 depicts a flowchart illustrating an example method of determining a corresponding edit distance between a corresponding segment of responsive content generated using a GM and a corresponding segment of additional data, in accordance with various implementations.

Turning now to FIG. 4, a flowchart illustrating an example method 400 of determining a corresponding edit distance between a corresponding segment of responsive content generated using a GM and a corresponding segment of additional data is depicted. For convenience, the operations of the method 400 are described with reference to a system that performs the operations. This system of the method 400 includes one or more processors, memory, and/or other component(s) of computing device(s) (e.g., client device 110 of FIG. 1, GM responsive content system 120 of FIG. 1, computing device 710 of FIG. 7, one or more servers, and/or other computing devices). Moreover, while operations of the method 400 are shown in a particular order, this is not meant to be limiting. One or more operations may be reordered, omitted, and/or added.

At block 452, the system normalizes responsive content that was generated using a GM. The system can cause a normalization engine (e.g., the normalization engine 131 or an additional instance thereof) to process the responsive content using various normalization operations to normalize the responsive content. For example, at sub-block 452A, the normalization engine can convert all capitalized alphanumeric characters in the responsive content into lowercase alphanumeric characters. As another example, at sub-block 452B, the normalization engine can convert all punctuation in the responsive content into single spaces. As yet another example, at sub-block 452C, the normalization engine can convert all white spaces and double spaces in the responsive content into single spaces. Additional, or alternative, normalization operations are contemplated herein.

At block 454, the system processes alphanumeric characters of the normalized responsive content to identify a word boundary in the responsive content. The system can cause a segmentation engine (e.g., the segmentation engine 132 or an additional instance thereof) to identify the word boundaries in the normalized responsive content. Notably, the word boundary can include any string of alphanumeric characters in the normalized responsive content that defines a word. The segmentation engine can continually process the normalized responsive content to identify word boundaries. If, at an iteration of block 454, the system determines that no word boundary in the normalized responsive content has been identified, then the system continues processing the normalized responsive content to identify a word boundary at block 454. If, at an iteration of block 454, the system determines that a word boundary has been identified, then the system proceeds to block 456.

At block 456, the system compares a given normalized responsive content segment to a given normalized additional data segment. At block 458, the system determines, based on the comparison, a corresponding quantity of alphanumeric characters in the given normalized responsive content segment that need to be inserted, deleted, and/or substituted to result in the given normalized additional data segment. At block 460, the system determines, based on dividing the corresponding quantity of alphanumeric characters in the given normalized responsive content segment that need to be inserted, deleted, and/or substituted to result in the given normalized additional data segment by a corresponding total quantity of alphanumeric characters in the given normalized additional data segment, the corresponding edit distance.

Notably, the additional data can include, for example, any GM training data (e.g., stored in the GM dataset index 130B), any search result documents obtained using a retrieval augmented generation (RAG) process, any user provided content that was received along with the user input, and/or any other data that is in addition to data included in the responsive content. Put another way, the method 400 of FIG. 4 can be utilized to determine whether a corresponding segment of the responsive content matches a corresponding segment of additional data as described with respect to the operations of block 356 of the method 300 of FIG. 3, and/or to perform other similar determinations described herein.

For example, the system can cause the attribution engine 150 to compare the given normalized responsive content segment to the given normalized additional data segment on an alphanumeric character by alphanumeric character basis. Based on comparing the given normalized responsive content segment to the given normalized additional data segment on the alphanumeric character by alphanumeric character basis, the comparison engine can determine the corresponding quantity of alphanumeric characters in the given normalized responsive content segment that need to be inserted, deleted, and/or substituted to result in the given normalized additional data segment.

For instance, assume that the given normalized additional data segment is "organize the worlds information and make it universally accessible and useful". Further assume that the given normalized responsive content segment is "organize the worlds information and make it universally accessible and useful". In this instance, the corresponding total quantity of alphanumeric characters in the given normalized additional data segment is 80, but no alphanumeric characters in the given normalized responsive content segment that need to be inserted, deleted, and/or substituted to result in the given normalized additional data segment. Accordingly, the corresponding edit distance is 0.0 and the given normalized responsive content segment is an exact match to the given normalized additional data segment.

Also, for instance, again assume that the given normalized additional data segment is "organize the worlds information and make it universally accessible and useful". However, assume that the given normalized responsive content segment is "organizing the worlds information and make it universally accessible and useful". In this instance, the corresponding total quantity of alphanumeric characters in the given normalized additional data segment is still 80, but 3 alphanumeric characters in the given normalized responsive content segment that need to be inserted, deleted, and/or substituted to result in the given normalized additional data segment (e.g., the difference between "organize" and "organizing" for substituting "e" with "ing"). Accordingly, the corresponding edit distance is 0.0375 (e.g., the 3 alphanumeric characters in the given normalized responsive content segment that need to be substituted divided by the 80 total alphanumeric characters in the given normalized additional data segment).

At block 462, the system determines whether the corresponding edit distance between the given normalized responsive content segment and the given normalized additional data segment satisfies an edit distance threshold. The system can cause the attribution engine 150 to compare the corresponding edit distance to the edit distance threshold to determine whether the corresponding edit distance satisfies the edit distance threshold. The edit distance threshold can be, for example, a tunable parameter that is tunable by a developer associated with the system.

If, at an iteration of block 462, the system determines that the corresponding edit distance between the given normalized responsive content segment and the given normalized additional data segment fails to satisfy the edit distance threshold, then the system returns to block 454 to continue with an additional iteration of the method 400 of FIG. 4. For instance, the system can continue identifying word boundaries and comparing respective instances of the normalized responsive content segments with respective instances of the normalized additional data segments to determine whether they match. Notably multiple instances of the operations of blocks 454-462 can be performed in a parallel manner, in a sequential manner, and/or in a combination of a parallel manner and sequential manner.

If, at an iteration of block 462, the system determines that the corresponding edit distance between the given normalized responsive content segment and the given normalized additional data segment satisfies the edit distance threshold, then the system determines that the given normalized responsive content segment matches the given normalized additional data segment as indicated at 464.

Although the method 400 of FIG. 4 is described with respect to determining whether a corresponding segment of the responsive content matches a corresponding segment of the additional data based on the corresponding edit distance therebetween, it should be understood that is for the sake of example and is not meant to be limiting. For example, in additional or alternative implementations, the system can process, using a hash function, the normalized and segmented responsive content to generate corresponding hashes for the responsive content, and compare the corresponding hashes for the responsive content to corresponding hashes for the additional data (e.g., that were previously generated and stored in the GM dataset index 130B, etc.). While the corresponding hashes enable quick and efficient comparison of these segments (e.g., relative to comparing raw strings), utilizing the corresponding hashes may not enable the system to account for minimal differences between the corresponding segments that can be accounted for using the corresponding edit distance as described herein.

Figure 5:
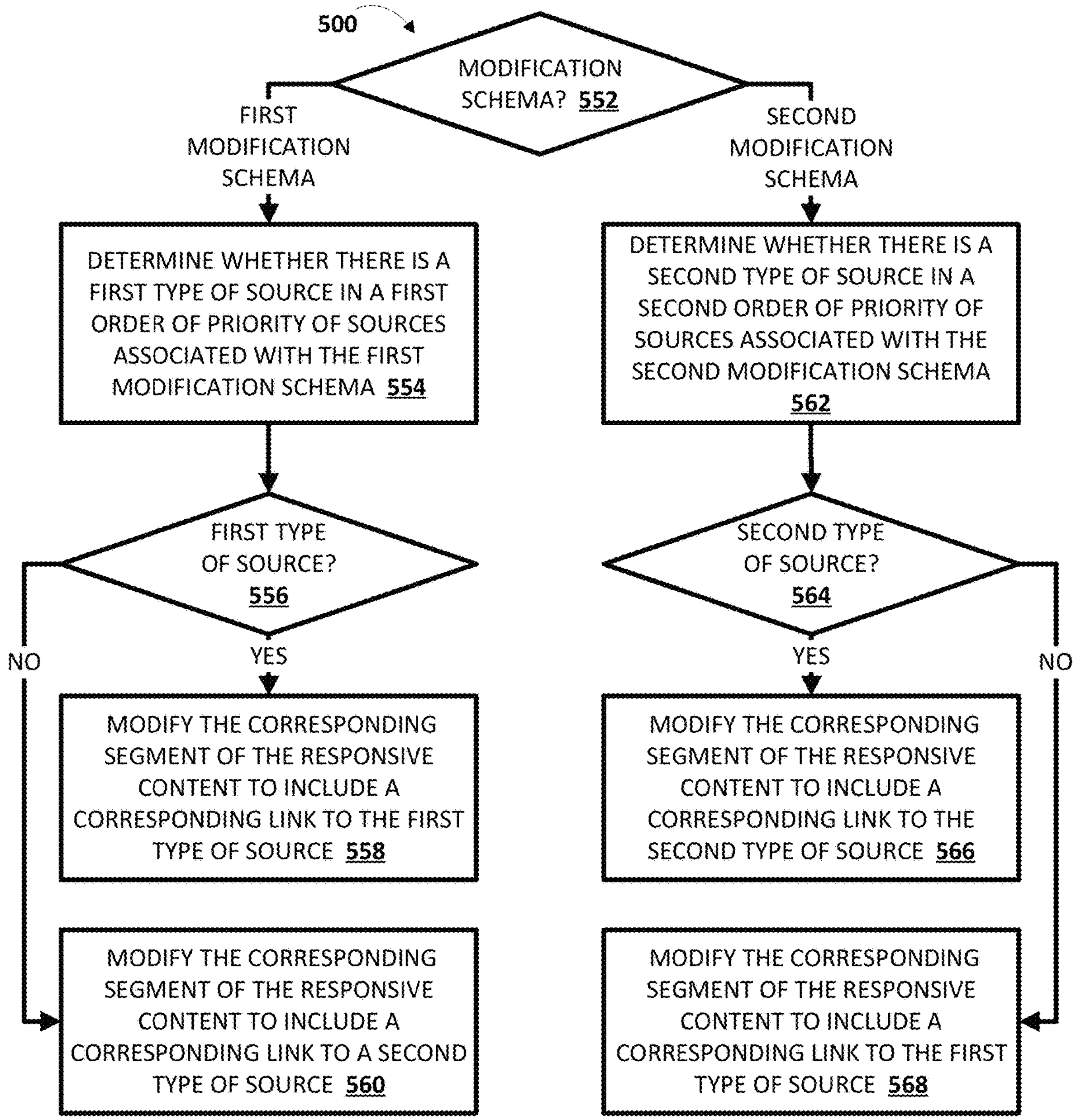
FIG. 5 depicts a flowchart illustrating an example method of determining a given modification schema for utilization in modifying a corresponding segment of responsive content generated using a GM, in accordance with various implementations.

Turning now to FIG. 5, a flowchart illustrating an example method 500 of determining a given modification schema for utilization in modifying a corresponding segment of responsive content generated using a GM is depicted. For convenience, the operations of the method 500 are described with reference to a system that performs the operations. This system of the method 500 includes one or more processors, memory, and/or other component(s) of computing device(s) (e.g., client device 110 of FIG. 1, GM responsive content system 120 of FIG. 1, computing device 710 of FIG. 7, one or more servers, and/or other computing devices). Moreover, while operations of the method 500 are shown in a particular order, this is not meant to be limiting. One or more operations may be reordered, omitted, and/or added.

At block 552, the system determines a modification schema to apply to a corresponding segment of responsive content that matches a corresponding segment of additional data. For example, the system can cause the modification schema engine 161 to determine the modification schema to apply to the corresponding segment of the responsive content that matches the corresponding segment of the additional data. The modification schema engine 161 can determine the given modification schema based on, for example, a type of request included in the user input, a type of content included in the responsive content, metadata that is received along with the user input, and/or other factors. Each of the plurality of modification schemas can prioritize different types of sources to cite in modifying the segment(s) of the responsive content. Accordingly, it should be understood that the given modification schema applied to the segment(s) of the responsive content can be one of a plurality of modification schemas, and each of the plurality of modification schemas can prioritize different type of sources in modifying the segment(s) of the responsive content.

With respect to the type of request included in the user input, if the user input includes a code generation type of request that request the GM generate code, then the system can cause the modification schema engine 161 to select a given modification schema that prioritizes attribution of types of sources that are typically associated with code (e.g., GitHub®, Stack Overflow®, etc.) over other types of sources. As another example, if the user input includes a text generation type of request that requests the GM generate text, then the system can cause the modification schema engine 161 to select a given modification schema that prioritizes attribution of types of sources that are typically associated with text (e.g., electronic books, other electronic documents, etc.) over other types of sources. As yet another example, if the user input includes a retrieval type of request that requests the GM retrieve one or more electronic documents, then the system can cause the modification schema engine 161 to select a given modification schema that prioritizes attribution of types of sources that are typically associated with retrieval (e.g., web pages, etc.) over other types of sources. Accordingly, it should be understood that the modification schema engine 161 can dynamically apply different modification schemas based on the type of request included in the user input.

With respect to the type of content included in the responsive content, if the responsive content includes code, then the system can cause the modification schema engine 161 to select a given modification schema that prioritizes attribution of types of sources that are typically associated with code (e.g., GitHub®, Stack Overflow®, etc.) over other types of sources, even if the user input did not explicitly request that the responsive content include code. As another example, if the responsive content includes text, then the system can cause the modification schema engine 161 to select a given modification schema that prioritizes attribution of types of sources that are typically associated with text (e.g., electronic books, other electronic documents, etc.) over other types of sources, even if the user input did not explicitly request that the responsive content include text. As yet another example, if the responsive content includes one or more electronic documents, then the system can cause the modification schema engine 161 to select a given modification schema that prioritizes attribution of types of sources that are typically associated with retrieval (e.g., web pages, etc.) over other types of sources, even if the user input did not explicitly request the GM use retrieval in the user input. Accordingly, it should be understood that the modification schema engine 161 can dynamically apply different modification schemas based on the type of content that is included in the responsive content.

With respect to the metadata that is received along with the user input, if the metadata indicates that the user input is received via first application programming interface (API), then the system can cause the modification schema engine 161 to select a given modification schema that prioritizes attribution of first type of sources over a second type of sources. However, if the metadata indicates that the user input is received via a second, different API, then the system can cause the modification schema engine 161 to select a given modification schema that prioritizes the second type of sources over the first type of sources. As another example, if the metadata indicates that the user input is received via a first type of client device (e.g., a mobile phone), then the system can cause the modification schema engine 161 to select a given modification schema that prioritizes attribution of first type of sources (e.g., that are more suitable for being rendered at the mobile phone) over a second type of sources (e.g., that are less suitable for being rendered at the mobile phone). However, if the metadata indicates that the user input is received via a second, different type of client device (e.g., a tablet device), then the system can cause the modification schema engine 161 to select a given modification schema that prioritizes the second type of sources (e.g., that are more suitable for being rendered at the tablet device) over the first type of sources (e.g., that are less suitable for being rendered at the tablet device). As yet another example, if the metadata indicates that the user input is received via a first type interface (e.g., a voice interface), then the system can cause the modification schema engine 161 to select a given modification schema that prioritizes attribution of first type of sources (e.g., that are more suitable for being rendered via voice) over a second type of sources (e.g., that are less suitable for being rendered via voice). However, if the metadata indicates that the user input is received via a second, different type of interface (e.g., a touchscreen interface), then the system can cause the modification schema engine 161 to select a given modification schema that prioritizes the second type of sources (e.g., that are more suitable for being rendered via the touchscreen interface) over the first type of sources (e.g., that are less suitable for being rendered via the touchscreen interface). Accordingly, it should be understood that the modification schema engine 161 can dynamically apply different modification schemas based on the type of metadata that is received along with the user input.

If, at an iteration of block 552, the system determines to apply a first modification schema to the corresponding segment of the responsive content, then the system proceeds to block 554. At block 554, the system determines whether there is a first type of source in a first order of priority of sources associated with the first modification schema. For example, the system can cause the modification engine 162 to determine whether there is a first type of source in a first order of priority of sources associated with the first modification schema. At block 556, if the system determines that the first type of source exists in the first order of priority of sources associated with the first modification schema, then the system proceeds to block 558. At block 558, the system modifies the corresponding segment of the responsive content to include a corresponding link to the first type of source. For example, the system can cause the modification engine 162 to modify the corresponding segment to include a corresponding link to a particular source that is of the first type of source. At block 556, if the system determines that the first type of source does not exist in the first order of priority of sources associated with the first modification schema, then the system proceeds to block 560. At block 560, the system modifies the corresponding segment of the responsive content to include a corresponding link to a second type of source. For example, the system can cause the modification engine 162 to modify the corresponding segment to include a corresponding link to a particular source that is of the second type of source. Put another way, based on the first modification schema, the modification engine 162 can attempt to prioritize attribution of the first type of sources over other types of sources, but fall back to these other types of sources when the first type of sources are not available.

If, at an iteration of block 552, the system determines to apply a second modification schema to the corresponding segment of the responsive content, then the system proceeds to block 562. At block 562, the system determines whether there is a second type of source in a second order of priority of sources associated with the second modification schema. For example, the system can cause the modification engine 162 to determine whether there is a second type of source in a second order of priority of sources associated with the second modification schema. Notably, the second order of priority of sources associated with the second modification schema can be different than the first order of priority of sources associated with the first modification schema. At block 564, if the system determines that the second type of source exists in the second order of priority of sources associated with the second modification schema, then the system proceeds to block 566. At block 566, the system modifies the corresponding segment of the responsive content to include a corresponding link to the second type of source. For example, the system can cause the modification engine 162 to modify the corresponding segment to include a corresponding link to a particular source that is of the second type of source. At block 564, if the system determines that the second type of source does not exist in the second order of priority of sources associated with the second modification schema, then the system proceeds to block 568. At block 568, the system modifies the corresponding segment of the responsive content to include a corresponding link to a first type of source. For example, the system can cause the modification engine 162 to modify the corresponding segment to include a corresponding link to a particular source that is of the first type of source. Put another way, based on the second modification schema, the modification engine 162 can attempt to prioritize attribution of the second type of sources over other types of sources, but fall back to these other types of sources when the second type of sources are not available.

Although the method 500 of FIG. 5 is described with respect to a first modification schema and a second modification schema, it should be understood that this is for the sake of illustrating various techniques contemplated herein and is not meant to be limiting. For example, in additional or alternative implementations, the modification schema engine 161 can select any modification schema that is stored in the modification schema database 160A. In some implementations, one or more of the plurality of modification schemas stored in the modification schema database 160A can be defined by a developer that is associated with the system. In additional or alternative implementations, one or more of the plurality of modification schemas stored in the modification schema database 160A can be defined automatically by the system (e.g., based on heuristics). In additional or alternative implementations, one or more of the plurality of modification schemas stored in the modification schema database 160A can be defined by a third-party that can access the system.

Further, although the method 500 of FIG. 5 is described with respect to only considering a first type of source and a second type of source in a given modification schema, it should be understood that this is for the sake of illustrating various techniques contemplated herein and is not meant to be limiting. For example, in additional or alternative implementations, the method 500 can selectively consider a third type of source, a fourth type of source, etc. in lieu of or in conjunction with the first type of source and the second type of source.

Moreover, although the method 500 of FIG. 5 is described with respect to modifying only a single segment of the responsive content using the given modification schema, it should be understood that is for the sake of brevity and is not meant to be limiting. For example, in additional or alternative implementations, the modification engine 162 can determine to utilize different modification schemas for different segments of the responsive content that match different segments of the additional data.

Furthermore, although the method 500 of FIG. 5 is described with respect to modifying the corresponding segment of the responsive content to include corresponding links to sources, it should be understood that is for the sake of example and is not meant to be limiting. Rather, it should be understood that other modifications to the corresponding segment of the responsive content are contemplated herein. For example, in additional or alternative implementations, the modification engine 162 can modify the corresponding segment to also include a corresponding link to license(s) in situations where the responsive content includes segment(s) that are associated with licensed content. As another example, in additional or alternative implementations, the modification engine 162 can modify the corresponding segment to truncate and/or omit the corresponding segment of the responsive content at N alphanumeric characters (e.g., where N is positive integer). As yet another example, in additional or alternative implementations, the modification engine 162 can modify the corresponding segment by re-generating the corresponding segment of the responsive content and/or re-generating the responsive content using the GM. In this example, the system can optionally adjust parameter(s) associated with the GM (e.g., a tunable temperature parameter) and/or include instructions to bias away from the corresponding segment of the responsive content to re-generate the corresponding segment of the responsive content and/or to re-generate the responsive content.

Figure 6A:
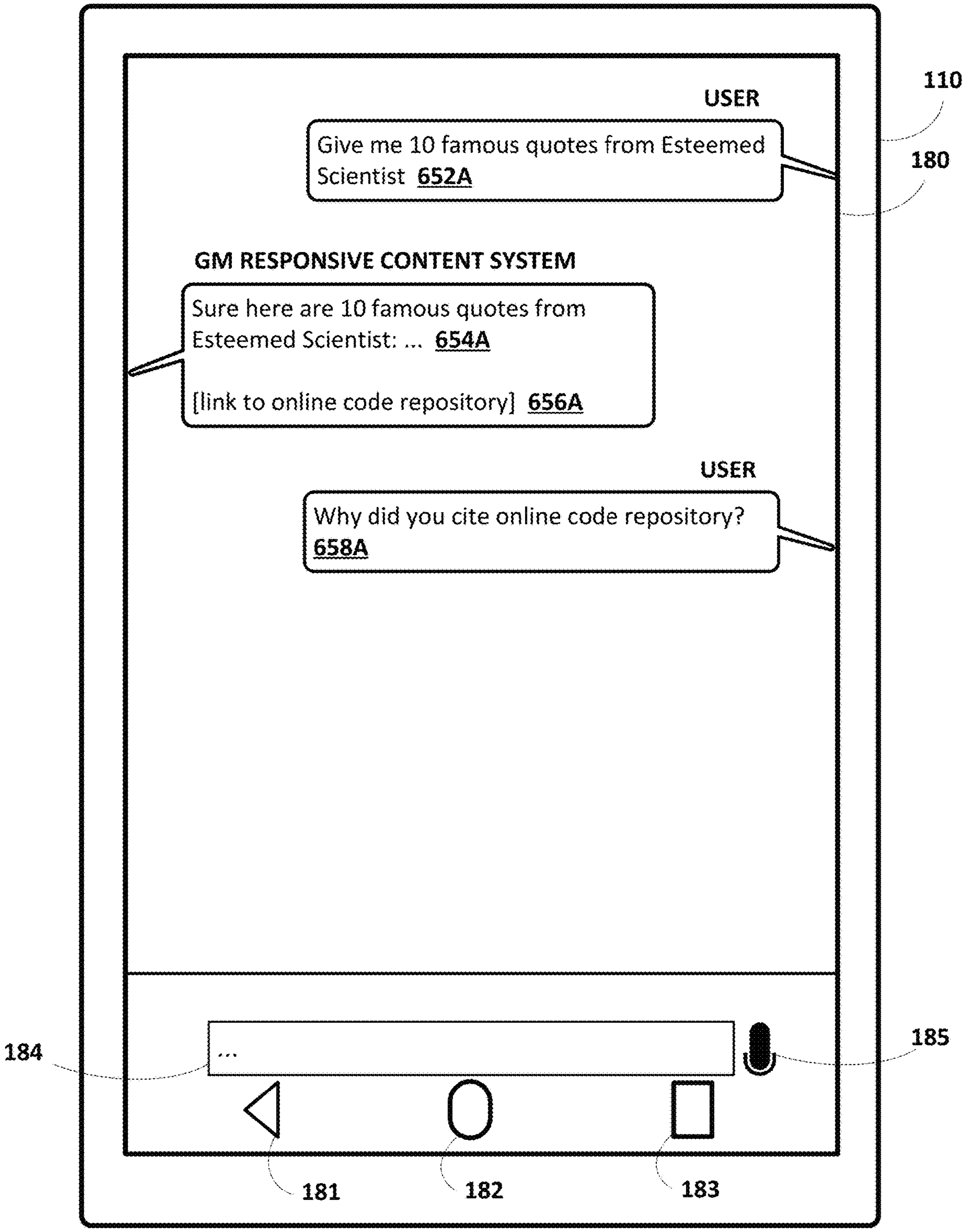
FIG. 6A and FIG. 6B depict various non-limiting examples of a client device rendering responsive content generated using a GM, in accordance with various implementations.
Figure 6B:
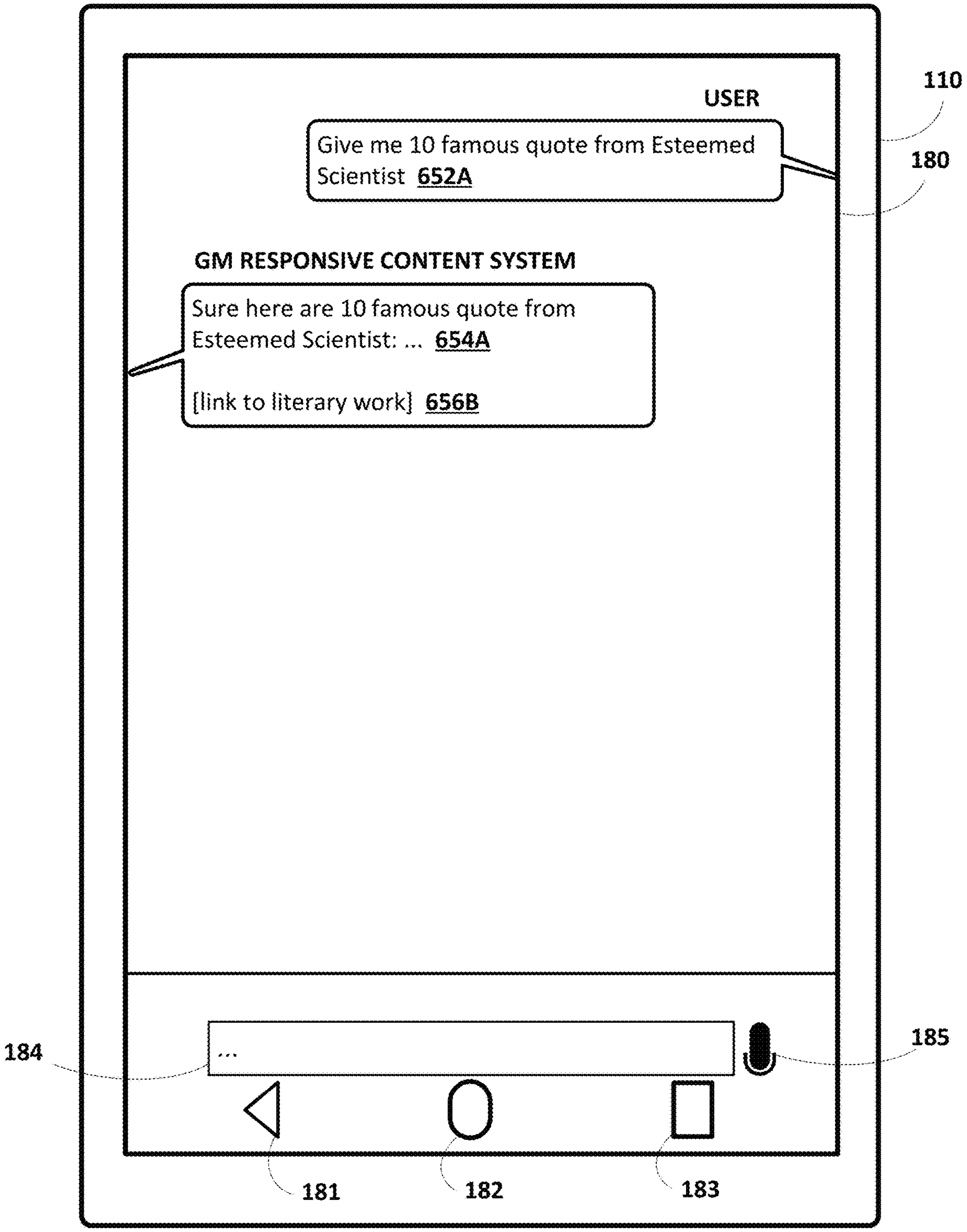

Turning now to FIGS. 6A and 6B, various non-limiting examples of a client device rendering responsive content generated using a GM are depicted. A client device 110 may include various user interface components including, for example, microphone(s) to generate audio data based on spoken utterances and/or other audible input, speaker(s) to audibly render synthesized speech and/or other audible output, and/or a display 180 to visually render visual output. Further, the display 180 of the client device 110 can include various system interface elements 181, 182, and 183 (e.g., hardware and/or software interface elements) that may be interacted with by a user of the client device 110 to cause the client device 110 to perform one or more actions. The display 180 of the client device 110 enables the user to interact with content rendered on the display 180 by touch input (e.g., by directing user input to the display 180 or portions thereof (e.g., to a text entry box 184, to a keyboard (not depicted), or to other portions of the display 180)) and/or by spoken input (e.g., by selecting microphone interface element 185—or just by speaking without necessarily selecting the microphone interface element 185 (i.e., an automated assistant may monitor for one or more terms or phrases, gesture(s) gaze(s), mouth movement(s), lip movement(s), and/or other conditions to activate spoken input) at the client device 110). Although the client device 110 depicted in FIG. 6A and FIG. 6B is a mobile phone, it should be understood that is for the sake of example and is not meant to be limiting. For example, the client device 110 may be a standalone speaker with a display, a standalone speaker without a display, a home automation device, an in-vehicle system, a laptop, a desktop computer, and/or any other device capable of executing an automated assistant to engage in a human-to-computer dialog session with the user of the client device 110.

Referring specifically to FIG. 6A, assume that a user of the client device 110 is interacting with a GM responsive content system (e.g., the GM responsive content system 120 from FIG. 1) that does not dynamically apply different modification schemas as described herein. Further assume that the user of the client device 110 directs user input 652A of "Give me 10 famous quotes from Esteemed Scientist." to the GM responsive content system. In this example, the GM responsive content system can generate responsive content that includes a first portion 654A including the 10 famous quotes from the Esteemed Scientist as requested by the user and includes a second portion 656A that includes a link to a corresponding source of the 10 famous quotes from Esteemed Scientist. Notably, in the example of FIG. 6A, the GM responsive content system can determine that corresponding segments of the responsive content are attributable to one or more sources that include the 10 famous quotes from the Esteemed Scientist. For instance, in this example, the exact 10 famous quotes can be found in an online code repository where an additional user uploaded the 10 famous quotes. However, citing an online code repository for the 10 famous quotes may objectively confuse the user due to the lack of any logical *nexus* between the code repository and the user requesting literary information (e.g., the 10 most famous quotes). As a result, the user may provide additional user input 658A of "Why did you cite online code repository?" in an attempt to figure out why the responsive content includes the link to the online code repository, thereby wasting computational and/or network resources since the GM responsive content system has to process the additional user input and thereby prolonging the human-to-computer dialog between the user and the GM responsive content system, or otherwise providing a subpar user experience by providing unhelpful citations.

In contrast, and referring specifically to FIG. 6B, assume that a user of the client device 110 is interacting with the GM responsive content system that dynamically applies different modification schemas as described herein. Further assume that the user of the client device 110 directs the same user input 652A of "Give me 10 famous quotes from Esteemed Scientist." to the GM responsive content system. In this example, the GM responsive content system can generate responsive content that includes the same first portion 654A including the 10 famous quotes from the Esteemed Scientist as requested by the user and includes a different second portion 656B that includes a link to a corresponding source of the 10 famous quotes from Esteemed Scientist. Notably, in the example of FIG. 6B, the GM responsive content system can determine that, even though the exact 10 famous quotes can be found in an online code repository where an additional user uploaded the 10 famous quotes like in the example of FIG. 6B, the exact 10 famous quotes are also found in a literary work. Accordingly, and based on the exact 10 famous quotes being found in the literary work, the GM responsive content system can determine to prioritize literary sources over the online code repository due to the logical nexus between the user's request and literary sources. As a result, the user may not provide any additional user input(s) in an attempt to figure out why the responsive content includes the link to the literary work as indicated at 656B.

Although the example of FIG. 6B is described with respect to applying a given modification schema based on the type of request included in the user input, it should be understood that is for the sake of example and is not meant to be limiting. As described herein, in additional or alternative implementations, the GM responsive content system can apply a given modification schema based on, for example, the type of content that is included in the responsive content, the metadata that is received along with or included with the user input, and/or other factors.

Figure 7:
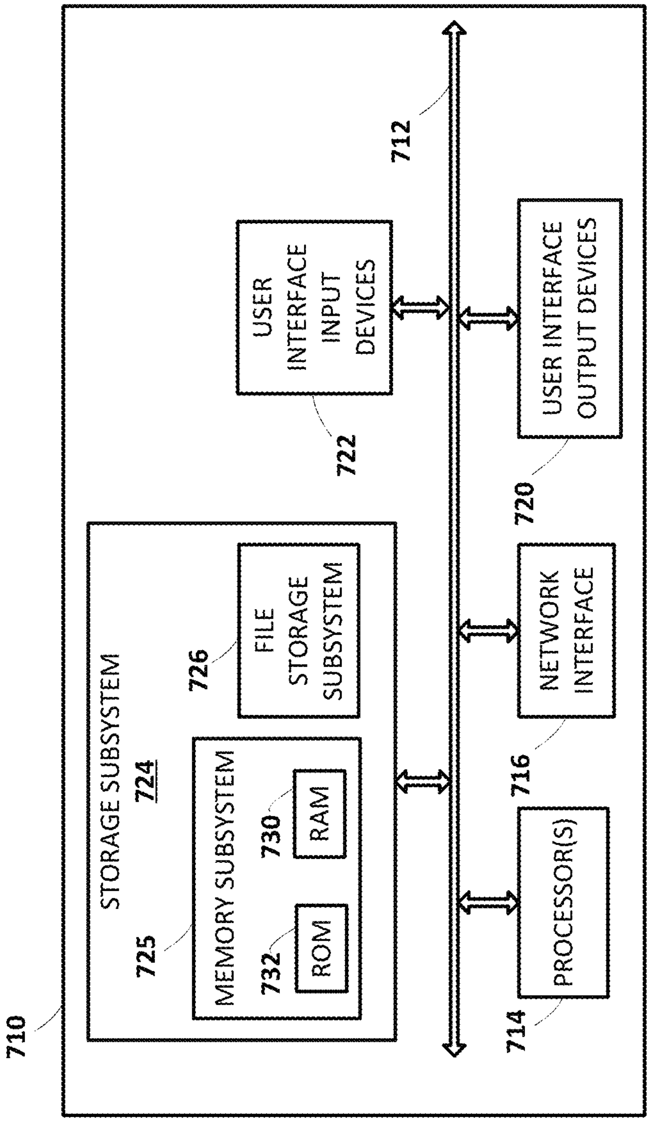
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a system is provided that includes at least one processor; and memory storing instructions that, when executed by the at least one processor, cause the at least one processor to be operable to: receive user input that is associated with a client device of a user; generate, based on processing at least the user input and using a generative model (GM), responsive content that is responsive to the user input; and determine whether a corresponding segment of the responsive content matches a corresponding segment of additional data. Further, in response to determining that a corresponding segment of the responsive content matches a corresponding segment of the additional data, the at least one processor is operable to: determine a given modification schema, from among a plurality of modification schemas, to apply to modify the corresponding segment of the responsive content, the given modification schema being determined based on one or more of: a type of request included in the user input, a type of content included in the responsive content, or metadata that is received along with the user input; modify, based on the given modification schema, the corresponding segment of the responsive content to generate modified responsive content; and cause the modified responsive content, in lieu of the responsive content, to be rendered at the client device of the user.

These and other implementations of technology disclosed herein can optionally include one or more of the following features.

In some implementations, the given modification schema can be determined based on the type of the request included in the user input, and the given modification schema can differ based on the type of the request included in the user input.

In some versions of those implementations, the instructions to determine the given modification schema, from among the plurality of modification schemas, to apply to modify the corresponding segment of the responsive content can include instructions to, in response to determining that the type of the request included in the user input is a first type of request from among a plurality of different types of requests: determine the given modification schema is a first modification schema that includes a first order of priority of sources that are associated with the corresponding segment of the additional data.

In some further versions of those implementations, the instructions to determine the given modification schema, from among the plurality of modification schemas, to apply to modify the corresponding segment of the responsive content further can include instructions to, in response to determining that the type of the request included in the user input is a second type of request, from among the plurality of different types of requests, that differs from the first type of request: determine the given modification schema is a second modification schema that includes a second order of priority of the sources that are associated with the corresponding segment of the additional data. The second order of priority of the sources associated with the corresponding segment of the additional data can differ from the first order of priority of the sources associated with the corresponding segment of the additional data.

In some yet further versions of those implementations, the instructions to modify the corresponding segment of the responsive content to the generate modified responsive content and based on the given modification schema can include instructions to, in response to determining the given modification schema is the first modification schema: generate the modified responsive content by including a corresponding link to a first type of source, the first type of source being first in the first order of priority of the sources that are associated with the corresponding segment of the additional data, and the first type source not being first in the second order of priority of the sources that are associated with the corresponding segment of the additional data.

In some even yet further versions of those implementations, the instructions to modify the corresponding segment of the responsive content to the generate modified responsive content and based on the given modification schema further can include instructions to, in response to determining the given modification schema is the second modification schema: generate the modified responsive content by including a corresponding link to a second type of source, the second type of source being first in the second order of priority of the sources that are associated with the corresponding segment of the additional data, and the second type of source not being first in the first order of priority of the sources that are associated with the corresponding segment of the additional data.

In additional or alternative versions of those implementations, the plurality of different types of requests can include one or more of: a code generation type of request that requests the GM generate code; a text generation type of request that requests the GM generate text; a text translation type of request that requests the GM translate text; an analytical type of request that requests the GM analyze one or more mathematical problems or one or more scientific concepts; an analytical type of request that requests the GM analyze one or more electronic documents; or a retrieval type of request that requests the GM retrieve one or more electronic documents.

In some implementations, the given modification schema can be determined based on the type of the content included in the responsive content, and the given modification schema can differ based on the content included in the responsive content.

In some versions of those implementations, the instructions to determine the given modification schema, from among the plurality of modification schemas, to apply to modify the corresponding segment of the responsive content can include instructions to, in response to determining that the type of the content included in the responsive content is a first type of content from among a plurality of different types of content: determine the given modification schema is a first modification schema that includes a first order of priority of sources that are associated with the corresponding segment of the additional data.

In some further versions of those implementations, the instructions to determine the given modification schema, from among the plurality of modification schemas, to apply to modify the corresponding segment of the responsive content further can include instructions to, in response to determining that the type of the content included in the responsive content is a second type of content, from among the plurality of different types of content, that differs from the first type of content: determine the given modification schema is a second modification schema that includes a second order of priority of the sources that are associated with the corresponding segment of the additional data. The second order of priority of the sources associated with the corresponding segment of the additional data can differ from the first order of priority of the sources associated with the corresponding segment of the additional data.

In some yet further versions of those implementations, the instructions to modify the corresponding segment of the responsive content to the generate modified responsive content and based on the given modification schema can include instructions to, in response to determining the given modification schema is the first modification schema: generate the modified responsive content by including a corresponding link to a first type of source, the first type of source being first in the first order of priority of the sources that are associated with the corresponding segment of the additional data, and the first type of source not being first in the second order of priority of the sources that are associated with the corresponding segment of the additional data.

In some even yet further versions of those implementations, the instructions to modify the corresponding segment of the responsive content to the generate modified responsive content and based on the given modification schema further can include instructions to, in response to determining the given modification schema is the second modification schema: generate the modified responsive content by including a corresponding link to a second type of source, the second type of source being first in the second order of priority of the sources that are associated with the corresponding segment of the additional data, and the second type of source not being first in the first order of priority of the sources that are associated with the corresponding segment of the additional data.

In additional or alternative versions of those implementations, the plurality of different types of content can include one or more of: a generative code type of output that includes code generated by the GM; a generative text type of output that includes text generated by the GM; a generative translation type of output that includes translated text generated by the GM; a generative analysis type of output that includes analysis of one or more mathematical problems or one or more scientific concepts analyzed by the GM; a generative analysis type of output that includes analysis of one or more electronic documents analyzed by the GM; or a retrieval type of output that includes one or more electronic documents retrieved by the GM.

In some implementations, the given modification schema can be determined based on the metadata that is received along with the user input, and the given modification schema can differ based on content of the metadata that is received along with the user input.

In some versions of those implementations, the instructions to determine the given modification schema, from among the plurality of modification schemas, to apply to modify the corresponding segment of the responsive content can include instructions to, in response to determining that the content of the metadata includes first metadata: determine the given modification schema is a first modification schema that includes a first order of priority of sources that are associated with the corresponding segment of the additional data.

In some further versions of those implementations, the instructions to determine the given modification schema, from among the plurality of modification schemas, to apply to modify the corresponding segment of the responsive content further can include instructions to, in response to determining that the content of the metadata includes second metadata that differs from the first metadata: determine the given modification schema is a second modification schema that includes a second order of priority of the sources that are associated with the corresponding segment of the additional data. The second order of priority of the sources associated with the corresponding segment of the additional data can differ from the first order of priority of the sources associated with the corresponding segment of the additional data.

In some yet further versions of those implementations, the instructions to modify the corresponding segment of the responsive content to the generate modified responsive content and based on the given modification schema can include instructions to, in response to determining the given modification schema is the first modification schema: generate the modified responsive content by including a corresponding link to a first type of source, the first type of source being first in the first order of priority of the sources that are associated with the corresponding segment of the additional data, and the first type of source not being first in the second order of priority of the sources that are associated with the corresponding segment of the additional data.

In some even yet further versions of those implementations, the instructions to modify the corresponding segment of the responsive content to the generate modified responsive content and based on the given modification schema further can include instructions to, in response to determining the given modification schema is the second modification schema: generate the modified responsive content by including a corresponding link to a second type of source, the second type of source being first in the second order of priority of the sources that are associated with the corresponding segment of the additional data, and the second type of source not being first in the first order of priority of the sources that are associated with the corresponding segment of the additional data.

In additional or alternative versions of those implementations, the content of the metadata can include one or more of: a client device type of the client device of the user via which the user input was received; a user interface type of a user interface of the client device of the user via which the user input was received; an application programming interface (API) via which the user input was received; a user account type of a user account of the user of the client device; or an user account status of a user account of the user of the client device.

In some implementations, the additional data can include training data utilized to train the GM, and the at least one processor can be further operable to, prior to receiving the user input: normalize, using one or more normalization operations, the training data to generate normalized training data; segment the normalized training data into a plurality of normalized training data segments; and store, in one or more databases, the plurality of normalized training data segments.

In some versions of those implementations, the at least one processor can be further operable to: normalize, using the one or more normalization operations, the responsive content to generate normalized responsive content; and segment the normalized responsive content into a plurality of normalized responsive content segments.

In some further versions of those implementations, the responsive content can be normalized and segmented subsequent to the responsive content being generated.

In additional or alternative further versions of those implementations, the instructions to determine whether a corresponding segment of the responsive content matches a corresponding segment of the additional data can include instructions to: determine, based on a comparison of the plurality of normalized training data segments to the plurality of normalized responsive content segments, whether a corresponding segment of the responsive content matches a corresponding segment of the additional data.

In some further versions of those implementations, the instructions to determine whether a corresponding segment of the responsive content matches a corresponding segment of the additional data based on the comparison of the plurality of normalized training data segments to the plurality of normalized responsive content segments can include instructions to: determine a corresponding quantity of alphanumeric characters in a normalized instance of the corresponding segment of the responsive content that need to be inserted, deleted, and/or substituted to result in a normalized instance the corresponding segment of the additional data; determine a corresponding edit distance between the normalized instance of the corresponding segment of the responsive content and the normalized instance of the corresponding segment of the additional data as a function of (a) the corresponding quantity of alphanumeric characters in a normalized instance of the corresponding segment of the responsive content that need to be inserted, deleted, and/or substituted to result in a normalized instance the corresponding segment of the additional data; and (b) a corresponding total quantity of alphanumeric characters in the normalized instance of the corresponding segment of the additional data; and in response to determining that the corresponding edit distance between the normalized instance of the corresponding segment of the responsive content and the normalized instance of the corresponding segment of the additional data satisfies an edit distance threshold: determine that a corresponding segment of the responsive content matches a corresponding segment of the additional data.

In some implementations, the additional data includes training data utilized to train the GM, and the at least one processor can be further operable to: process, using a hash function, the training data to generate a plurality of corresponding hashes for the training data; and store, in one or more databases, the plurality of corresponding hashes for the training data.

In some versions of those implementations, the at least one processor can be further operable to, prior to processing the training data to generate the plurality of corresponding hashes for the training data and using the hash function: normalize, using one or more normalization operations, the training data to generate normalized training data; and segment the normalized training data into a plurality of normalized training data segments. The instructions to process the training data to generate the plurality of corresponding hashes for the training data and using the hash function can include instructions to: process, using the hash function, the plurality of normalized training data segments to generate the plurality of corresponding hashes for the training data.

In some additional or alternative versions of those implementations, the at least one processor can be further operable to: process, using the hash function, the responsive content to generate a plurality of corresponding hashes for the responsive content.

In some further versions of those implementations, the at least one processor can be further operable to, prior to processing the responsive content to generate the plurality of corresponding hashes for the responsive content and using the hash function: normalize, using the one or more normalization operations, the responsive content to generate normalized responsive content; and segment the normalized responsive content into a plurality of normalized responsive content segments. The instructions to process the responsive content to generate the plurality of corresponding hashes for the responsive content and using the hash function can include instructions to: process, using the hash function, the plurality of normalized responsive content segments to generate the plurality of corresponding hashes for the responsive content.

In further additional or alternative versions of those implementations, the instructions to determine whether a corresponding segment of the responsive content matches a corresponding segment of the additional data can include instructions to: determine, based on a comparison of the plurality of corresponding hashes for the training data to the plurality of corresponding segments for the responsive content, whether a corresponding segment of the responsive content matches a corresponding segment of the additional data.

In yet further versions of those implementations, the plurality of corresponding hashes for the responsive content can be generated subsequent to the responsive content being generated.

In some implementations, the instructions to cause the modified responsive content to be rendered at the client device of the user can include instructions to: transmit data indicative of the modified responsive content to the client device. Transmitting the data indicative of the modified responsive content to the client device can cause the client device to visually render the modified responsive content via a display of the client device and/or audibly render the modified responsive content via one or more speakers of the client device.

In some implementations, the instructions to cause the modified responsive content to be rendered at the client device of the user can include instructions to: cause the modified responsive content to be visually rendered via a display of the client device and/or audibly rendered via one or more speakers of the client device.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the steps of the aforementioned systems. Some implementations also include a method implemented by one or more processors to perform any of the steps of the aforementioned systems.

What is claimed is:

1. A system comprising:

at least one processor; and memory storing instructions that, when executed by the at least one processor, cause the at least one processor to be operable to:

receive user input that is associated with a client device of a user;

generate, based on processing at least the user input and using a generative model (GM), responsive content that is responsive to the user input;

determine whether a corresponding segment of the responsive content matches a corresponding segment of additional data; and in response to determining that a corresponding segment of the responsive content matches a corresponding segment of the additional data:

determine a given modification schema, from among a plurality of modification schemas, to apply to modify the corresponding segment of the responsive content, the given modification schema being determined based on a type of request included in the user input, wherein the given modification schema differs based on the type of the request included in the user input, and wherein the instructions to determine the given modification schema, from among the plurality of modification schemas, to apply to modify the corresponding segment of the responsive content comprise instructions to:
in response to determining that the type of the request included in the user input is a first type of request from among a plurality of different types of requests:
determine the given modification schema is a first modification schema that includes a first order of priority of sources that are associated with the corresponding segment of the additional data;
modify, based on the given modification schema, the corresponding segment of the responsive content to generate modified responsive content; and
cause the modified responsive content, in lieu of the responsive content, to be rendered at the client device of the user.

2. The system of claim 1, wherein the instructions to determine the given modification schema, from among the plurality of modification schemas, to apply to modify the corresponding segment of the responsive content further comprise instructions to:
in response to determining that the type of the request included in the user input is a second type of request, from among the plurality of different types of requests, that differs from the first type of request:
determine the given modification schema is a second modification schema that includes a second order of priority of the sources that are associated with the corresponding segment of the additional data,
wherein the second order of priority of the sources associated with the corresponding segment of the additional data differs from the first order of priority of the sources associated with the corresponding segment of the additional data.

3. The system of claim 2, wherein the instructions to modify the corresponding segment of the responsive content to generate modified responsive content and based on the given modification schema comprise instructions to:
in response to determining the given modification schema is the first modification schema:
generate the modified responsive content by including a corresponding link to a first type of source, the first type of source being first in the first order of priority of the sources that are associated with the corresponding segment of the additional data, and the first type of source not being first in the second order of priority of the sources that are associated with the corresponding segment of the additional data.

4. The system of claim 3, wherein the instructions to modify the corresponding segment of the responsive content to generate modified responsive content and based on the given modification schema further comprise instructions to:
in response to determining the given modification schema is the second modification schema:
generate the modified responsive content by including a corresponding link to a second type of source, the second type of source being first in the second order of priority of the sources that are associated with the corresponding segment of the additional data, and the second type of source not being first in the first order of priority of the sources that are associated with the corresponding segment of the additional data.

5. The system of claim 1, wherein the plurality of different types of requests comprise one or more of:
a code generation type of request that requests the GM generate code;
a text generation type of request that requests the GM generate text;
a text translation type of request that requests the GM translate text;
an analytical type of request that requests the GM analyze one or more mathematical problems or one or more scientific concepts;
an analytical type of request that requests the GM analyze one or more electronic documents; or
a retrieval type of request that requests the GM retrieve one or more electronic documents.

6. The system of claim 1, wherein the instructions to cause the modified responsive content to be rendered at the client device of the user comprise instructions to:
transmit data indicative of the modified responsive content to the client device, wherein transmitting the data indicative of the modified responsive content to the client device causes the client device to visually render the modified responsive content via a display of the client device and/or audibly render the modified responsive content via one or more speakers of the client device.

7. The system of claim 1, wherein the instructions to cause the modified responsive content to be rendered at the client device of the user comprise instructions to:
cause the modified responsive content to be visually rendered via a display of the client device and/or audibly rendered via one or more speakers of the client device.

8. A system comprising:
at least one processor; and
memory storing instructions that, when executed by the at least one processor, cause the at least one processor to be operable to:
receive user input that is associated with a client device of a user;
generate, based on processing at least the user input and using a generative model (GM), responsive content that is responsive to the user input;
determine whether a corresponding segment of the responsive content matches a corresponding segment of additional data; and
in response to determining that a corresponding segment of the responsive content matches a corresponding segment of the additional data:
determine a given modification schema, from among a plurality of modification schemas, to apply to modify the corresponding segment of the responsive content, the given modification schema being determined based on a type of content included in the responsive content, wherein the given modification schema differs based on the content included in the responsive content, and wherein the instructions to determine the given modification schema, from among the plurality of modification schemas, to apply to modify the corresponding segment of the responsive content comprise instructions to:

in response to determining that the type of the content included in the responsive content is a first type of content from among a plurality of different types of content:

determine the given modification schema is a first modification schema that includes a first order of priority of sources that are associated with the corresponding segment of the additional data;

modify, based on the given modification schema, the corresponding segment of the responsive content to generate modified responsive content; and cause the modified responsive content, in lieu of the responsive content, to be rendered at the client device of the user.

9. The system of claim 8, wherein the instructions to determine the given modification schema, from among the plurality of modification schemas, to apply to modify the corresponding segment of the responsive content further comprise instructions to:

in response to determining that the type of the content included in the responsive content is a second type of content, from among the plurality of different types of content, that differs from the first type of content:

determine the given modification schema is a second modification schema that includes a second order of priority of the sources that are associated with the corresponding segment of the additional data, wherein the second order of priority of the sources associated with the corresponding segment of the additional data differs from the first order of priority of the sources associated with the corresponding segment of the additional data.

10. The system of claim 9, wherein the instructions to modify the corresponding segment of the responsive content to generate modified responsive content and based on the given modification schema comprise instructions to:

in response to determining the given modification schema is the first modification schema:

generate the modified responsive content by including a corresponding link to a first type of source, the first type of source being first in the first order of priority of the sources that are associated with the corresponding segment of the additional data, and the first type of source not being first in the second order of priority of the sources that are associated with the corresponding segment of the additional data.

11. The system of claim 10, wherein the instructions to modify the corresponding segment of the responsive content to generate modified responsive content and based on the given modification schema further comprise instructions to:

in response to determining the given modification schema is the second modification schema:

generate the modified responsive content by including a corresponding link to a second type of source, the second type of source being first in the second order of priority of the sources that are associated with the corresponding segment of the additional data, and the second type of source not being first in the first order of priority of the sources that are associated with the corresponding segment of the additional data.

12. The system of claim 8, wherein the plurality of different types of content comprise one or more of:

a generative code type of output that includes code generated by the GM;

a generative text type of output that includes text generated by the GM;

a generative translation type of output that includes translated text generated by the GM;

a generative analysis type of output that includes analysis of one or more mathematical problems or one or more scientific concepts analyzed by the GM;

a generative analysis type of output that includes analysis of one or more electronic documents analyzed by the GM; or a retrieval type of output that includes one or more electronic documents retrieved by the GM.

13. The system of claim 8, wherein the instructions to cause the modified responsive content to be rendered at the client device of the user comprise instructions to:

transmit data indicative of the modified responsive content to the client device, wherein transmitting the data indicative of the modified responsive content to the client device causes the client device to visually render the modified responsive content via a display of the client device and/or audibly render the modified responsive content via one or more speakers of the client device.

14. The system of claim 8, wherein the instructions to cause the modified responsive content to be rendered at the client device of the user comprise instructions to:

cause the modified responsive content to be visually rendered via a display of the client device and/or audibly rendered via one or more speakers of the client device.

15. A system comprising:

at least one processor; and memory storing instructions that, when executed by the at least one processor, cause the at least one processor to be operable to:

receive user input that is associated with a client device of a user;

generate, based on processing at least the user input and using a generative model (GM), responsive content that is responsive to the user input;

determine whether a corresponding segment of the responsive content matches a corresponding segment of additional data; and in response to determining that a corresponding segment of the responsive content matches a corresponding segment of the additional data:

determine a given modification schema, from among a plurality of modification schemas, to apply to modify the corresponding segment of the responsive content, the given modification schema being determined based on metadata that is received along with the user input, wherein the given modification schema differs based on content of the metadata that is received along with the user input, and wherein the instructions to determine the given modification schema, from among the plurality of modification schemas, to apply to modify the corresponding segment of the responsive content comprise instructions to:

in response to determining that the content of the metadata includes first metadata:

determine the given modification schema is a first modification schema that includes a first order of priority of sources that are associated with the corresponding segment of the additional data;

modify, based on the given modification schema, the corresponding segment of the responsive content to generate modified responsive content; and cause the modified responsive content, in lieu of the responsive content, to be rendered at the client device of the user.

16. The system of claim 15, wherein the instructions to determine the given modification schema, from among the plurality of modification schemas, to apply to modify the corresponding segment of the responsive content further comprise instructions to:

in response to determining that the content of the metadata includes second metadata that differs from the first metadata:

determine the given modification schema is a second modification schema that includes a second order of priority of the sources that are associated with the corresponding segment of the additional data, wherein the second order of priority of the sources associated with the corresponding segment of the additional data differs from the first order of priority of the sources associated with the corresponding segment of the additional data.

17. The system of claim 16, wherein the instructions to modify the corresponding segment of the responsive content to generate modified responsive content and based on the given modification schema comprise instructions to:

in response to determining the given modification schema is the first modification schema:

generate the modified responsive content by including a corresponding link to a first type of source, the first type of source being first in the first order of priority of the sources that are associated with the corresponding segment of the additional data, and the first type of source not being first in the second order of priority of the sources that are associated with the corresponding segment of the additional data.

18. The system of claim 17, wherein the instructions to modify the corresponding segment of the responsive content to generate modified responsive content and based on the given modification schema further comprise instructions to:

in response to determining the given modification schema is the second modification schema:

generate the modified responsive content by including a corresponding link to a second type of source, the second type of source being first in the second order of priority of the sources that are associated with the corresponding segment of the additional data, and the second type of source not being first in the first order of priority of the sources that are associated with the corresponding segment of the additional data.

19. The system of claim 15, wherein the content of the metadata comprise one or more of:

a client device type of the client device of the user via which the user input was received;

a user interface type of a user interface of the client device of the user via which the user input was received;

an application programming interface (API) via which the user input was received;

a user account type of a user account of the user of the client device; or an user account status of a user account of the user of the client device.

20. The system of claim 15, wherein the instructions to cause the modified responsive content to be rendered at the client device of the user comprise instructions to:

transmit data indicative of the modified responsive content to the client device, wherein transmitting the data indicative of the modified responsive content to the client device causes the client device to visually render the modified responsive content via a display of the client device and/or audibly render the modified responsive content via one or more speakers of the client device; or cause the modified responsive content to be visually rendered via a display of the client device and/or audibly rendered via one or more speakers of the client device.

* * * * *